(12) United States Patent
Determan et al.

(10) Patent No.: US 8,666,113 B2
(45) Date of Patent: *Mar. 4, 2014

(54) SPECTRAL UNMIXING FOR VISUALIZATION OF SAMPLES

(71) Applicant: Cambridge Research & Instrumentation, Inc., Hopkinton, MA (US)

(72) Inventors: Scott Determan, North Andover, MA (US); Peter J. Miller, Cambridge, MA (US)

(73) Assignee: Cambridge Research & Instrumentation, Inc., Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/911,474

(22) Filed: Jun. 6, 2013

(65) Prior Publication Data

US 2013/0266192 A1  Oct. 10, 2013

Related U.S. Application Data

(63) Continuation of application No. 12/755,831, filed on Apr. 7, 2010, now Pat. No. 8,462,981.

(51) Int. Cl.
*G06K 9/00* (2006.01)
*G01J 5/02* (2006.01)
*G01J 3/28* (2006.01)

(52) U.S. Cl.
USPC ........................ 382/100; 250/339.01; 356/326

(58) Field of Classification Search
None
See application file for complete search history.

(56) References Cited

U.S. PATENT DOCUMENTS

| 5,521,705 | A | 5/1996 | Oldenbourg et al. |
| 5,539,517 | A | 7/1996 | Cabib et al. |
| 5,784,162 | A | 7/1998 | Cabib et al. |

(Continued)

FOREIGN PATENT DOCUMENTS

| WO | WO 98/43042 | 10/1998 |
| WO | WO 2005/040769 | 5/2005 |
| WO | WO 2006/081547 | 8/2006 |
| WO | WO 2008/039758 | 4/2008 |

OTHER PUBLICATIONS

Selim Aksoy et al., "Textural Features for Image Database Retrieval", IEEE, pp. 45-49 (1998).

(Continued)

*Primary Examiner* — Bhavesh Mehta
*Assistant Examiner* — Andrew Moyer
(74) *Attorney, Agent, or Firm* — Fish & Richardson P.C.

(57) ABSTRACT

Disclosed methods include: acquiring a first sequence of multiple images of a sample, with each image in the first sequence corresponding to a different spectral weighting function; unmixing the first sequence of images into data corresponding to a first set of unmixed images, where each unmixed image in the first set corresponds to a spatial distribution in the sample of a different one of multiple components at a first time; acquiring one or more additional images of the sample and combining the additional images with one or more of the images in the first sequence to form a second sequence of images; unmixing the second sequence of images into data corresponding to a second set of unmixed images; and displaying information about the sample as a function of time based on the data corresponding to the first and second sets of unmixed images.

44 Claims, 12 Drawing Sheets

(56) References Cited

U.S. PATENT DOCUMENTS

| | | | |
|---|---|---|---|
| 5,991,028 | A | 11/1999 | Cabib et al. |
| 5,995,645 | A | 11/1999 | Soenksen et al. |
| 6,007,996 | A | 12/1999 | McNamara et al. |
| 6,142,629 | A | 11/2000 | Adel et al. |
| 6,373,568 | B1 | 4/2002 | Miller et al. |
| 6,421,131 | B1 | 7/2002 | Miller |
| 6,466,687 | B1 | 10/2002 | Uppaluri et al. |
| 6,690,466 | B2 | 2/2004 | Miller et al. |
| 6,776,760 | B2 | 8/2004 | Marmarelis |
| 6,920,239 | B2 | 7/2005 | Douglass et al. |
| 6,924,893 | B2 | 8/2005 | Oldenbourg et al. |
| 8,315,472 | B2 | 11/2012 | Robinson et al. |
| 8,462,981 | B2 * | 6/2013 | Determan et al. ............ 382/100 |
| 2002/0113210 | A1 | 8/2002 | Treado et al. |
| 2003/0030801 | A1 | 2/2003 | Levenson et al. |
| 2003/0081204 | A1 | 5/2003 | Cronin et al. |
| 2003/0138140 | A1 | 7/2003 | Marcelpoil et al. |
| 2003/0223248 | A1 | 12/2003 | Cronin et al. |
| 2004/0159789 | A1 | 8/2004 | Treado et al. |
| 2005/0065440 | A1 | 3/2005 | Levenson |
| 2006/0033026 | A1 | 2/2006 | Treado et al. |
| 2006/0049354 | A1 | 3/2006 | Treado et al. |
| 2006/0082762 | A1 | 4/2006 | Leverette et al. |
| 2006/0091311 | A1 | 5/2006 | Treado et al. |
| 2006/0119865 | A1 | 6/2006 | Hoyt et al. |
| 2006/0151702 | A1 | 7/2006 | Treado et al. |
| 2006/0157652 | A1 | 7/2006 | Treado et al. |
| 2006/0164640 | A1 | 7/2006 | Treado et al. |
| 2006/0192956 | A1 | 8/2006 | Treado et al. |
| 2006/0245631 | A1 | 11/2006 | Levenson et al. |
| 2007/0016082 | A1 | 1/2007 | Levenson et al. |
| 2007/0231784 | A1 | 10/2007 | Hoyt et al. |
| 2008/0074644 | A1 | 3/2008 | Levenson et al. |
| 2008/0074649 | A1 | 3/2008 | Levenson et al. |
| 2008/0165344 | A1 | 7/2008 | Treado et al. |
| 2008/0192246 | A1 | 8/2008 | Neiss et al. |
| 2009/0097020 | A1 | 4/2009 | Treado et al. |
| 2009/0226059 | A1 | 9/2009 | Levenson et al. |
| 2009/0245605 | A1 | 10/2009 | Levenson et al. |
| 2009/0257640 | A1 | 10/2009 | Gossage et al. |
| 2010/0056928 | A1 | 3/2010 | Zuzak et al. |
| 2010/0075373 | A1 | 3/2010 | Hoyt |
| 2010/0322480 | A1 | 12/2010 | Banerjee et al. |
| 2011/0182490 | A1 | 7/2011 | Hoyt et al. |
| 2011/0299071 | A1 | 12/2011 | Treado et al. |
| 2012/0112098 | A1 | 5/2012 | Hoyt |

OTHER PUBLICATIONS

Bishop, Christopher M., "The Multi-Layer Perceptron", Neural Networks for Pattern Recognition (Oxford University Press, 1995), pp. 116-163.
Kenneth P. Camilleri et al., "Spectral Unmixing of Mixed Pixels for Texture Boundary Refinement", *IEEE*, pp. 1084-1087 (2000).
Gupta, et al. "Hyperspectral imager, from ultraviolet to visible, with a KDP acousto-optic tunable filter.", *Applied Optics* vol. 43, No. 13 pp. 2752-2759 (2004).
Haralick, R.M. et al., "Textural features for image classification", IEEE Transactions on Systems, Man, and Cybernetics, vol. SMC-3: 610-621 (1973).
Jimenez, L. et al., "Hyperspectral Data Analysis and Feature Reduction Via Projection in Pursuit", IEEE Transactions on Geoscience and Remote Sensing 37(6): 2653-2667 (1999).
Martin, Matt E., et al. "An AOTF-based dual-modality hyperspectral imaging system (DMHSI) capable of simultaneous fluorescence and reflectance imaging." *Medical Engineering & Physics* vol. 28, No. 2, pp. 149-155 (2006).
Paul M. Mather, "Classification 'What is or is not a cow is for the public to decide'", *Computer Processing of Remotely-Sensed Images: An Introduction, Third Edition*, John Wiley & Sons, Ltd.
Stephen W. Wharton, "A Contextual Classification Method for Recognizing Land Use Patterns in High Resolution Remotely Sensed Data", *Pattern Recognition*, vol. 15, No. 4, pp. 317-324 (1982).
Chinese Office Action for Application No. 200680010148.7 dated Dec. 19, 2008.
Chinese Office Action for Application No. 200680010148.7 dated Jul. 3, 2009.
European Office Action for Application No. 06 719 860.6, dated Nov. 7, 2007.
European Office Action/Summons to Attend Oral Proceedings for Application No. 06719 860.6, dated Feb. 3, 2011.
International Search Report and Written Opinion for International Application No. PCT/US2006/003197, dated May 22, 2006.
Chinese Office Action for Application No. 201010164482.6, dated Jun. 30, 2011.

* cited by examiner

SPECTRAL UNMIXING FOR VISUALIZATION OF SAMPLES

CROSS-REFERENCE TO RELATED APPLICATIONS

This application is a continuation application of and claims priority to U.S. application Ser. No. 12/755,831, filed on Apr. 7, 2010, which is incorporated in its entirety herein by reference.

TECHNICAL FIELD

This disclosure relates to measurement and processing of spectral images of samples.

BACKGROUND

Spectral imaging methods have proven to be useful techniques for studying complex samples, and can be used in different fields including microscopy, animal imaging, industrial product analysis, forensic detection of document anomalies, and analysis of artifacts and artwork such as paintings. Spectral imaging methods can include assembling an image cube that includes multiple image planes. Individual image planes can correspond, for example, to images of a sample that are measured at different detection wavelengths and/or irradiated at different illumination wavelengths. The image planes can be derived from measurements of one or more properties of a sample, including absorption of incident light, reflection of incident light, fluorescence, and scattering of incident light. An image cube can include a relatively large number of image planes so that computer-based analysis methods are used to extract information from the cube.

SUMMARY

In general, in a first aspect, the disclosure features computer-implemented methods that include: acquiring a first sequence of multiple images of a sample, with each image in the first sequence corresponding to a different spectral weighting function and with the sample including multiple components each having a different spectral signature; unmixing the first sequence of images into data corresponding to a first set of unmixed images, where each unmixed image in the first set corresponds to a spatial distribution in the sample of a different one of the multiple components at a first time; acquiring one or more additional images of the sample, with each of the additional images corresponding to a different one of the spectral weighting functions and combining the additional images with one or more of the images in the first sequence to form a second sequence of images; unmixing the second sequence of images into data corresponding to a second set of unmixed images, where each unmixed image in the second set corresponds to a spatial distribution in the sample of a different one of the multiple components at a second time; and displaying information about the sample as a function of time based on the data corresponding to the first and second sets of unmixed images.

Embodiments of the methods can include any one or more of the following features.

The methods can include: acquiring one or more further additional images of the sample, with each of the further additional images corresponding to a different one of the spectral weighting functions and combining the further additional images with one or more of the images in the second sequence to form a third sequence of images; and unmixing the third sequence of images into data corresponding to a third set of unmixed images, where each unmixed image in the third set corresponds to a spatial distribution in the sample of a different one of the multiple components at a third time, and where the displaying of the information as a function of time is based on the data corresponding to the first, second, and third sets of unmixed images.

Each sequence can include M images corresponding to a common set of the different spectral weighting functions, and the one or more additional images can include K<M additional image(s). There can be N<M unmixed images in each set of unmixed images. The parameter K can have a value of 1.

The methods can include repeating the acquiring of additional images and the unmixing of additional sequences to provide a real-time display of information about the sample as a function of time, where each additional sequence includes at least some images from a prior sequence and one or more newly acquired images so that each additional sequence includes at least M>1 images corresponding to a common set of the different spectral weighting functions.

The unmixing steps can include a linear decomposition into the spectral signatures of the components of the sample. Alternatively, or in addition, unmixing the second sequence of images into the data corresponding to the second set of images can include: for each of the images in the first set of unmixed images, determining a difference between the image in the first set of unmixed images and an image in the second set of unmixed images that corresponds to a common spectral weighting function; and adjusting the data corresponding to the image in the first set of unmixed images by an amount proportional to the difference. For each of the images in the first set of unmixed images, the amount proportional to the difference can correspond to a proportionality constant for a component corresponding to the image, and the proportionality constants for the components can be given by a vector corresponding to an inverse of a matrix formed by the spectral signatures of the components.

The displaying can include displaying any change between the first and second sets of unmixed images at a rate faster than 1 Hz.

The methods can include combining the second set of unmixed images to form an estimated spectrum of the sample, combining the second sequence of images to form an actual spectrum of the sample, comparing the actual spectrum of the sample to the estimated spectrum of the sample to determine an extent of errors in the second set of unmixed images, and displaying information indicative of the comparison.

The methods can include: acquiring a fourth sequence of multiple images of the sample, with each image in the fourth sequence corresponding to a different one of the spectral weighting functions and where none of the images in the fourth sequence were acquired as part of any of the first, second, and third sequences; unmixing the fourth sequence of images into data corresponding to a fourth set of unmixed images, where each unmixed image in the fourth set corresponds to a spatial distribution in the sample of a different one of the multiple components at a fourth time; thereafter acquiring one or more additional images of the sample, with each of the thereafter-acquired additional images corresponding to a different one of the spectral weighting functions and combining the thereafter-acquired additional images with one or more of the images in the fourth sequence to form a fifth sequence of images; and unmixing the fifth sequence of images into data corresponding to a fifth set of unmixed images, where each unmixed image in the fifth set corresponds to a spatial distribution in the sample of a different one of the multiple components at a fifth time. The displaying of the information as a function of time can be based on the data corresponding to at least the five sets of unmixed images.

The methods can include: for one or more locations of the sample, comparing actual signal corresponding to at least one of the sequences of images to a reconstructed signal based on the corresponding linear decomposition to determine a residual error for the linear decomposition; and displaying information indicative of the comparison.

Embodiments of the methods can also include any of the other features and/or steps disclosed herein in connection with any embodiments, as appropriate.

In another aspect, the disclosure features apparatus that includes a radiation source configured to direct radiation to a sample that includes multiple components each having a different spectral signature, a detector configured to receive radiation from the sample, and an electronic processor configured to: (a) acquire a first sequence of multiple images of the sample based on radiation measured by the detector, with each image in the first sequence corresponding to a different spectral weighting function; (b) unmix the first sequence of images into data corresponding to a first set of unmixed images, where each unmixed image in the first set corresponds to a spatial distribution in the sample of a different one of the multiple components at a first time; (c) acquire one or more additional images of the sample, with each of the additional images corresponding to a different one of the spectral weighting functions; (d) combine the additional images with one or more of the images in the first sequence to form a second sequence of images; (e) unmix the second sequence of images into data corresponding to a second set of unmixed images, where each unmixed image in the second set corresponds to a spatial distribution in the sample of a different one of the multiple components at a second time; and (f) display information about the sample as a function of time based on the data corresponding to the first and second sets of unmixed images.

Embodiments of the apparatus can include any of the features disclosed herein in connection with any embodiments, as appropriate.

In a further aspect, the disclosure features apparatus that includes a computer-readable medium storing a program that causes an electronic processor to: (a) acquire a first sequence of multiple images of a sample, with each image in the first sequence corresponding to a different spectral weighting function and with the sample including multiple components each having a different spectral signature; (b) unmix the first sequence of images into data corresponding to a first set of unmixed images, where each unmixed image in the first set corresponds to a spatial distribution in the sample of a different one of the multiple components at a first time; (c) acquire one or more additional images of the sample, with each of the additional images corresponding to a different one of the spectral weighting functions; (d) combine the additional images with one or more of the images in the first sequence to form a second sequence of images; (e) unmix the second sequence of images into data corresponding to a second set of unmixed images, where each unmixed image in the second set corresponds to a spatial distribution in the sample of a different one of the multiple components at a second time; and (f) display information about the sample as a function of time based on the data corresponding to the first and second sets of unmixed images.

Embodiments of the apparatus can include any of the features disclosed herein in connection with any embodiments, as appropriate.

Unless otherwise defined, all technical and scientific terms used herein have the same meaning as commonly understood by one of ordinary skill in the art to which this disclosure belongs. All publications, patent applications, patents, and other references mentioned herein are incorporated by reference in their entirety. In case of conflict, the present specification, including definitions, will control.

The details of one or more embodiments are set forth in the accompanying drawings and the description. Other features and advantages will be apparent from the description, drawings, and claims.

DESCRIPTION OF DRAWINGS

Like reference symbols in the various drawings indicate like elements.

DETAILED DESCRIPTION

Figure 1:
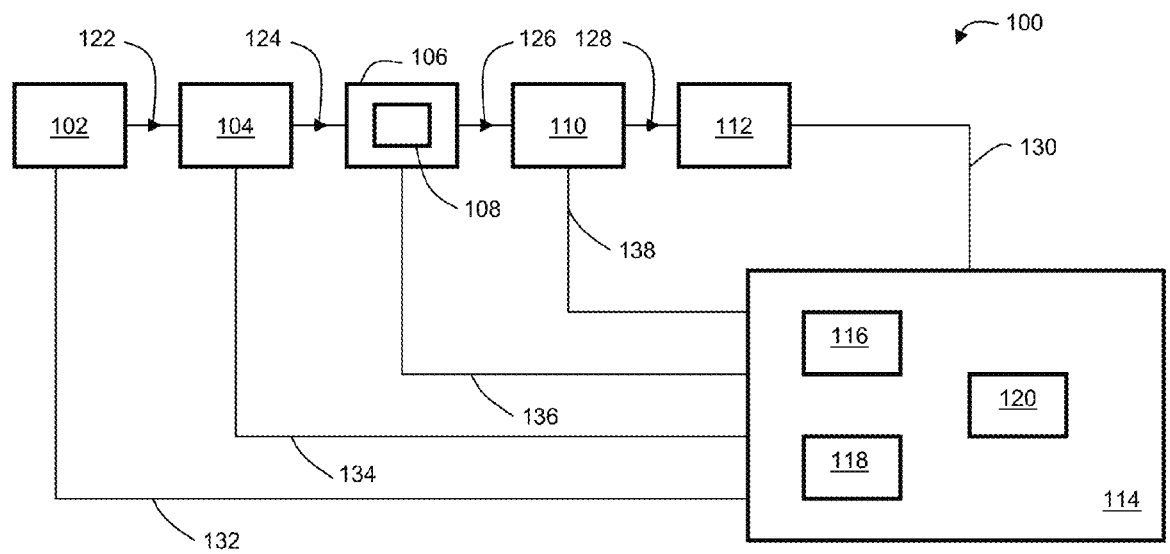
FIG. 1 is a schematic diagram of a spectral imaging system.

Spectral unmixing methods can provide accurate estimates for contributions of different sample components to measurements of radiation from a sample (e.g., emitted from a sample, transmitted through a sample, reflected by a sample, scattered by a sample). Disclosed herein are spectral unmixing methods and systems that implement unmixing operations. The operations can include overlapping unmixing, in which a portion of the data in an image cube is replaced with new data before component estimates are determined. The operations can also include incremental unmixing operations, in which improved estimates for sample components are determined from only portions of the data in an image cube. Overlapping unmixing and incremental unmixing operations can be used individually or together to obtain component estimates and images. Further, overlapping unmixing and/or incremental unmixing operations can be combined with other techniques (e.g., full unmixing) to obtain component estimates.

In general, in unmixing operations, an image cube including multiple two-dimensional planes (e.g., each corresponding to excitation and/or measurement at a different wavelength) for a sample is obtained, and then the image cube is processed to obtain estimates for contributions of each of the sample's components to the image cube. When a sample is being imaged over a period of time, updated component estimates can then be obtained by acquiring another image cube at a later time, and processing the later-acquired cube to obtain new component estimates. The component estimates can be displayed to a system operator as they are obtained to provide the operator with information about the changing nature of the sample over time.

Measurement of a new full image cube of data, and subsequent processing of the full new image cube, requires both time and a certain amount of computational processing power. The time needed to acquire a full image cube of new data can limit the rate at which new component estimates (e.g., in the form of component images) are presented to a system operator. Further, the number of computational operations involved in processing a full image cube of data to obtain the updated component estimates can place a relatively high processing burden on an imaging system and, as a consequence, can limit the rate at which component estimates are determined and the number of other operations that the imaging system can perform at the same time.

In overlapping unmixing, updated component estimates are determined before all of the data in an image cube has been replaced with new data. That is, to obtain updated component estimates, only some of the data in the image cube is updated (e.g., by acquiring one or more sample images that are incorporated into the image cube as planes of the cube). Then, the data in the image cube is processed to yield updated component images. As a result, some of the data used to determine new component estimates "overlaps" with a portion of the data used to determine previous component estimates. By using overlapping unmixing, updated component estimates can be provided at a faster rate to a system operator than would otherwise be possible if a full image cube of new data was acquired before every update of the component estimates. In some embodiments, component images can be displayed to a system operator and updated in real-time or near real-time, facilitating easier visualization of the sample as it changes (e.g., changes can include changes in the structure and/or position of the sample). As used herein, "real-time" refers to an imaging modality in which images displayed to a system operator are updated at a frequency of 1 Hz or greater.

In incremental unmixing operations, only a portion of the data in an image cube is used to determine updated estimates for sample components; thus, the new component estimates are determined "incrementally" from the data in the image cube. Incremental unmixing operations reduce the number of computations involved in obtaining updated component estimates. As a result, the overall processing load of the imaging system is reduced. Updated component estimates can be determined at higher rates than would be possible with full unmixing operations, and incremental unmixing operations can be implemented using processors that might otherwise not be able to handle the processing requirements for full unmixing within a reasonable amount of time; thus, incremental unmixing operations can lower the overall processing requirements for implementation of unmixing. In some embodiments, overlapping unmixing can be implemented with incremental unmixing operations to further enhance the capabilities of an imaging system, permitting updated component estimates to be displayed to a system operator at a higher frequency. In certain embodiments, incremental unmixing operations can be interleaved with full unmixing.

The methods and systems disclosed herein can implement residual error determination to provide indices representative of the extent to which actual measured sample images correspond to reconstructed images determined from estimates of the sample components. Such indices provide information about the reliability of the component estimates, and can be used to improve the accuracy of calculated component estimates by segregating sample images into regions which can yield reliable estimates of sample components, and regions which are suspect.

A wide variety of different samples can be investigated using the methods and systems disclosed herein. In some embodiments, for example, the sample is a histological sample such as a tissue specimen that has been stained with one or more stains that absorb and/or scatter illumination light. One or more of the sample components corresponds to the stains applied to the specimen. In certain embodiments, images obtained by the system are processed to yield transmission images in units such as optical density. The processed images can be used in the unmixing operations. In certain embodiments, the sample is a tissue specimen or a living animal that includes one or more fluorescent agents, and the components of the sample correspond to the different fluorescent agents therein.

Spectral Imaging Systems

A variety of systems and techniques can be used to obtain spectral images and form spectral image cubes. For example, in some embodiments, spectral images can be obtained by using an imaging device (e.g., a camera such as a CCD camera) with one or more wavelength-selective filtering elements to allow a range of wavelengths of illumination light to reach the sample, and/or to allow a range of wavelengths of light from the sample to reach the imaging device. Varying the one or more wavelength-selective filtering elements to allow different ranges of wavelengths of illumination light and/or light from the sample to pass permits multiple two-dimensional images of the sample to be obtained, some or all of the two-dimensional images corresponding to different illumination and/or measurement wavelengths.

These two-dimensional images can be assembled to form a three-dimensional image cube. Two of the three dimensions in the image cube correspond to the two spatial dimensions common to each of the two-dimensional images. The third dimension of the image cube corresponds to a spectral dimension. That is, at each pixel location in the image cube, pixel values extending along the third dimension of the cube correspond to measurements of the same spatial location in the sample at different illumination wavelengths and/or different wavelengths of light from the sample. For each pixel in the two-dimensional spatial images of the sample, pixel values extending along the third dimension of the image cube correspond to information about wavelength-dependent properties of a particular spatial location in the sample. In some embodiments, for example, the wavelength-dependent information corresponds to a spectrum for some or all of the pixels. Thus, in general, image cubes include multiple individual image planes, some or all of which are acquired with different settings applied to the wavelength selective elements.

Image cubes can be analyzed in a variety of ways, including by using spectral unmixing methods. Typically, spectral unmixing techniques can be used together with a spectral library to analyze an image cube. A spectral library can include, for example, a set of wavelength-dependent functions, each of which can be associated with a different component in the sample. In general, as used herein, a "component" corresponds to an entity in the sample such as a stain, a dye, a biochemical entity, a marker, or any other type of chemical or physical moiety; a state or condition of the sample, such as temperature, pH, stress, or strain; and/or any other attribute of the sample that affects the interaction between the sample and illumination light, thereby affecting the sample's optical properties. Exemplary components include, for example, histological stains, immunohistochemical stains, fluorescent dyes, fluorescent proteins, quantum dots, bilirubin, red blood cells, luminous chemical moieties, bioluminescent chemical moieties, and endogenous compounds that cause autofluorescence of the irradiated sample. Because components can be associated directly with spectra in a spectral library, the term "library component" refers to spectral information in a library that corresponds to a "component" present in a corresponding sample.

FIG. 1 is a schematic diagram showing a system 100 for acquiring spectral images of a sample. A light source 102 provides light 122 to light conditioning optics 104. Light 122 can be incoherent light, such as light generated from a filament source for example, or light 122 can be coherent light, such as light generated by a laser. Light 122 can be either continuous-wave (CW) or time-gated (e.g., pulsed) light. Further, light 122 can be provided in a selected portion of the electromagnetic spectrum. For example, light 122 can have a central wavelength and/or a distribution of wavelengths that falls within the ultraviolet, visible, infrared, or other regions of the spectrum.

Light conditioning optics 104 can be configured to transform light 122 in a number of ways. For example, light conditioning optics 104 can spectrally filter light 122 to provide output light in a selected wavelength region of the spectrum. Alternatively, or in addition, light conditioning optics can adjust the spatial distribution of light 122 and the temporal properties of light 122. Incident light 124 is generated from light 122 by the action of the elements of light conditioning optics 104.

Incident light 124 is directed to be incident on sample 108 mounted on illumination stage 106. Stage 106 can provide means to secure sample 108, such as mounting clips or other fastening devices. Alternatively, stage 106 can include a movable track or belt on which a plurality of samples 108 are affixed. A driver mechanism can be configured to move the track in order to successively translate the plurality of samples, one at a time, through an illumination region on stage 106, whereon incident light 124 impinges. Stage 106 can further include translation axes and mechanisms for translating sample 108 relative to a fixed position of illumination stage 106. The translation mechanisms can be manually operated (e.g., threaded rods) or can be automatically movable via electrical actuation (e.g., motorized drivers, piezoelectric actuators).

In response to incident light 124, emitted light 126 emerges from sample 108. Emitted light 126 can be generated in a number of ways. For example, in some embodiments, emitted light 126 corresponds to a portion of incident light 124 transmitted through sample 108. In certain embodiments, emitted light 126 corresponds to a portion of incident light 124 reflected from sample 108. In some embodiments, incident light 124 can be absorbed by sample 108, and emitted light 126 corresponds to fluorescence emission from sample 108 in response to incident light 124. In certain embodiments, sample 108 can be luminescent, and may produce emitted light 126 even in the absence of incident light 124. In some embodiments, emitted light 126 can include light produced via two or more of the foregoing mechanisms.

Sample 108 can be a biological sample such as a tissue slice (e.g., a sample used for pathology, or a cell suspension or smear, as in cytology studies), or living or fixed cells in tissue culture. In some embodiments, sample 108 can be an animal (e.g., a mouse), individual bacteria or other microorganisms, bacterial or other colonies, embryos, oocytes, plants, including seeds or grains, or sample 108 can be a non-biological entity.

Light collecting optics 110 are positioned to received emitted light 126 from sample 108. Light collecting optics 110 can be configured to collimate emitted light 126 when light 126 is divergent, for example. Light collecting optics 110 can also be configured to spectrally filter emitted light 126. Filtering operations can be useful, for example, to isolate portions of emitted light 126 arising via one of the mechanisms discussed above from light arising via other processes. Further, light collecting optics 110 can be configured to modify the spatial and/or temporal properties of emitted light 126 for particular purposes in embodiments. Light collecting optics 110 transform emitted light 126 into output light 128 which is incident on detector 112.

Detector 112 includes one or more elements such as CCD sensors configured to detect output light 128. In some embodiments, detector 112 can be configured to measure the spatial and/or temporal and/or spectral properties of light 128. Detector 112 generates an electrical signal that corresponds to output light 128, and is communicated via electrical communication line 130 to electronic control system 114.

Electronic control system 114 includes a processor 116, a display device 118, and a user interface 120. In addition to receiving signals corresponding to output light 128 detected by detector 112, control system 114 sends electrical signals to detector 112 to adjust various properties of detector 112. For example, if detector 112 includes a CCD sensor, control system 114 can send electrical signals to detector 112 to control the exposure time, active area, gain settings, and other properties of the CCD sensor.

Electronic control system 114 also communicates with light source 102, light conditioning optics 104, illumination stage 106, and light collecting optics 110 via electrical communication lines 132, 134, 136, and 138, respectively. Control system 114 provides electrical signals to each of these elements of system 100 to adjust various properties of the elements. For example, electrical signals provided to light source 102 can adjust the intensity, wavelength, repetition rate, and/or other properties of light 122. Signals provided to light conditioning optics 104 and light collecting optics 110 can include signals for configuring properties of devices that adjust the spatial properties of light (e.g., spatial light modulators) and for configuring spectral filtering devices, for example. Signals provided to illumination stage 106 can provide for positioning of sample 108 relative to stage 106 and/or for moving samples into position for illumination on stage 106, for example.

Control system 114 includes a user interface 120 for displaying system properties and parameters, and for displaying captured images of sample 108. User interface 120 is provided in order to facilitate operator interaction with, and control over, system 100. Processor 116 is typically connected to a storage device for storing image data captured using detector 112, and also includes computer software that embodies instructions to processor 116 that cause processor 116 to carry out control functions, such as those discussed above for example. Further, the software instructions cause processor 116 to mathematically manipulate the images captured by detector 112 and to provide images of components in sample 108 derived from measured spectral images.

System 100 is typically configured to acquire multiple spectral images of sample 108. The multiple spectral images may correspond to illumination of sample 108 at a variety of selected wavelengths of light, and detecting an intensity of light either transmitted through or reflected by sample 108. Alternatively, the multiple spectral images may correspond to illumination of sample 108 with light having similar spectral properties, and collecting multiple images of sample 108, each image corresponding to a different wavelength of emitted light 126. Spectral filtering elements in light conditioning optics 104 and light collecting optics 110 are generally used to obtain the spectrally resolved data. In some embodiments, the multiple spectral images can include both images corresponding to illumination of sample 108 with different wavelengths of light, and images corresponding to different wavelengths of emitted light from sample 108.

In some embodiments, images of sample 108 can be collected in sequence, with adjustments to the configuration of optical components (e.g., optical filters) between successive captured images. In certain embodiments, multiple images can be captured simultaneously using detection systems configured to detect multiple sample views. For example, detection systems can be configured to project different views of the sample corresponding to different illumination or emission wavelengths onto a detector such as a CCD camera, and the multiple views can be captured simultaneously.

In some embodiments, light conditioning optics 104 include an adjustable spectral filter element such as a filter wheel or a liquid crystal spectral filter. The filter element can be configured to provide for illumination of sample 108 using different light wavelength bands. Light source 102 can provide light 122 having a broad distribution of spectral wavelength components. A selected region of this broad wavelength distribution is allowed to pass as incident light 124 by the filter element in light conditioning optics 104, and directed to be incident on sample 108. An image of light 126 transmitted through sample 108 is recorded by detector 112. In general, as used herein, an image is a measurement of an intensity distribution of light from a sample (e.g., transmitted through the sample, reflected from the sample, emitted by the sample, scattered from the sample) as a function of position within the sample. Typically, measured images are two-dimensional so that the intensity distribution is expressed as a function of two position coordinates.

Subsequently, the wavelength of the filter pass-band in light conditioning optics 104 is changed to provide incident light 124 having a different wavelength, and an image of light 126 transmitted through sample 108 (and corresponding to the new wavelength of incident light 124) is recorded. A similar set of spectrally-resolved images can also be recorded by employing a light source 102 having multiple source elements generating light of different wavelengths, and alternately turning the different source elements on and off to provide incident light 124 having different wavelengths.

As discussed previously, the emitted light 126 from sample 108 can also correspond to incident light 124 that is reflected from sample 108. Further, emitted light 126 can correspond to fluorescence emission from sample 108 if the sample includes fluorescent chemical moieties. For some samples, emitted light 126 can include contributions from multiple sources (e.g., transmission and fluorescence) and the spectral filtering elements in light conditioning optics 110 can be used to separate these signal contributions.

Exemplary spectral filtering elements that can be used in both light conditioning optics 104 and light collecting optics 110 include, for example, liquid-crystal tunable filters (LCTFs) and acousto-optic tunable filters (AOTFs). Other exemplary spectral filtering elements include mechanical filter wheels with multiple optical filters that can be engaged in sequence (e.g., by rotating the wheel). Exemplary wavelength-selective elements can also include one or more configurable light sources 102 that generate light 122. Light sources 102 can be adjusted to produce light 122 in one or more selected wavelength bands, for example. Light sources can be constructed using multiple light emitting diodes (LEDs), some or all of which emit light in different regions of the electromagnetic spectrum. Alternatively, or in addition, light sources 102 can include broadband light sources in combination with wavelength selecting elements such as diffraction gratings and spatial light modulators (e.g., a digital micromirror device (DMD), available from Texas Instruments, Dallas, Tex.). The wavelength selecting elements can be configured so that only certain wavelengths of light generated by the broadband sources are incident on sample 108.

In some embodiments, wavelength-selective filtering can be performed by a Sagnac interferometer, a liquid crystal interferometer, or another type of imaging interferometer-based detection system. At a selected time, an interferometer measures a spectral response for a sample that is a periodic function of wavelength rather than a single well-defined wavelength band. The response of an interferometer is characterized by an optical path difference $\Delta$ which defines the periodic wavelength function. Interferometric images can be unmixed directly to yield component estimates in frequency space. Alternatively, images obtained using an interferometer can be transformed into a set of spectral images at particular wavelengths (e.g., central wavelengths) by applying a Fourier transform or a similar operation to the images. Spectral images obtained by transforming images from an interferometer can form planes of an image cube corresponding to specific wavelength bands, and can be used as input data for overlapping unmixing. Further, spectral images derived from interferometer images can be used as input data for incremental unmixing operations.

Because both light conditioning optics 104 and light collecting optics 110 can include configurable spectral filter elements, spectral resolution can be provided either on the excitation side of sample 108 (e.g., via light conditioning optics 104) or on the emission side of sample 108 (e.g., via light collecting optics 110), or both. The multiple, spectrally resolved images of sample 108 form an image cube as discussed above, where each image in the cube is a two-dimensional image of the sample corresponding to a particular wavelength. The third cube dimension corresponds to spectral wavelength, and wavelength-dependent information about particular spatial locations within the sample (e.g., as represented by pixels in the spectral images) extends along the third dimension. As used herein, a pixel corresponds nominally to a common spatial location in the sample for each of the spectral images in an image cube.

Spectral Unmixing

Spectral unmixing is a mathematical operation performed on an image cube to provide quantitative estimates of the amounts of each of several components present in a sample. In some embodiments, spectral unmixing techniques reference one or more spectral libraries that include information about spectral properties of sample components. Typically, spectral unmixing techniques are applied to each pixel along each of the two spatial dimensions of an image cube. The result of the unmixing operations is a high resolution map of each of the components (e.g., chemical entities and/or conditions) that are present in the sample.

As an example, a sample may contain three different types of structures, each labeled with a different dye. The three different dyes may each have different absorption spectra. Typically, the individual absorption spectra of the dyes are known before they are used (e.g., from a spectral library), or they can be measured. Images of the illuminated sample will contain, in the most general case, spectral contributions from each of the three dyes. A similar situation arises, for example, in samples containing multiple different fluorescence labels, each of which contribute to measured fluorescence emission from the sample.

Spectral unmixing decomposes one or more images that include contributions from multiple spectral sources into a set of component images (the "unmixed images") that correspond to contributions from each of the spectral entities within the sample. Thus, if the sample includes three different dyes, each specific to a particular structural entity, then an image of the sample can be separated into three unmixed images, each unmixed image reflecting contributions principally from only one of the dyes. In general, as used herein, the term "component" refers to an entity (a chemical moiety, a biological entity, or any other entity) that contributes to radiation that is detected from a sample. Thus, a sample's components each contribute to the radiation (e.g., transmitted radiation, reflected radiation, scattered radiation, emitted radiation) emanating from the sample. Each of the components has a spectral signature or eigenstate that describes its pure spectral properties (e.g., the spectral properties of the component with no other components present). Further, the term "component image," as used herein, refers to an image of a sample that includes (substantially) only contributions from a single component of the sample; that is, an image of the sample with spectral properties that can be expressed in terms of a single component's spectral signature or eigenstate. The process of "unmixing," as used herein, refers to a process in which a sample image that includes contributions from multiple components is separated into a set of unmixed images, each unmixed image including contributions from only a subset of the components in the sample. If the unmixed images each include contributions from only one component in the sample, the unmixed images are component images.

The unmixing procedure essentially corresponds to decomposing an image into a set of spectral eigenstates. In some embodiments, the eigenstates are known beforehand, as discussed above. In certain embodiments, the eigenstates can sometimes be determined using techniques such as principal component analysis. In either case, once the eigenstates have been identified or estimated, an image can be decomposed by calculating a set of values, usually as a coefficient matrix, that corresponds to the relative weighting of each of the eigenstates in the overall image. The contributions of each of the individual eigenstates can then be separated out to yield the unmixed image set.

As an example, a series of two dimensional images having x and y coordinates can be measured for a sample by illuminating the sample at a set of different excitation wavelengths $\lambda_k$. As described above, the two dimensional images can be combined to form a three-dimensional image cube $S(x,y,k)$ where the first two indices of the image cube represent coordinate directions, and the third index is a spectral index corresponding to the wavelength of the illumination light. Assuming, for the sake of simplicity, that each of the images of the sample contains spectral contributions from two different spectral sources $F(\lambda_k)$ and $G(\lambda_k)$, then the values in the three-dimensional image cube $S(x,y,k)$ may be given by $$S(x,y,k)=a(x,y)\cdot F(\lambda_k)+b(x,y)\cdot G(\lambda_k) \qquad (1)$$

where $\lambda_k$ is used to denote a given wavelength (or wavelength band). The functions $a(x,y)$ and $b(x,y)$ describe the spatial abundance of the spectral contributions from the two different spectral sources in the sample.

According to Equation (1), the net signal at any position in the three-dimensional image cube (e.g., at any two-dimensional pixel coordinate, and at a particular illumination wavelength) is the sum of two contributions, weighted by the relative abundance of each. This can be expressed as $$S(\lambda_k)=aF(\lambda_k)+bG(\lambda_k) \qquad (2)$$

The functions F and G can be termed the "spectral eigenstates" for the system because they correspond to the pure spectra for the spectral sources in the sample, which are combined in varying proportions to produce the measured spectral images of the sample. Thus, the sample spectrum is a weighted superposition corresponding to separate contributions from the two spectral sources.

If the spectra $F(\lambda_k)$ and $G(\lambda_k)$ are known (or can be deduced), then Equation (2) can be inverted to solve for a and b, provided that spectrum I includes at least two elements (e.g., provided that one has data for at least two wavelengths $\lambda_k$). Equation (2) can be rewritten in matrix form as $S=EA$, so that $$A=E^{-1}S \qquad (3)$$

where A is a column vector with components a and b, and E is a matrix whose columns are the spectral eigenstates, namely [F G].

Using Equation (3), measured spectral images of a sample can be used to calculate contributions to the images arising purely from source F and purely from source G at particular pixel locations. The process can be repeated for each pixel location in a selected image (e.g., throughout the range of values x and y in S) to produce an image of the sample that includes contributions only from source F, and another image of the sample that includes contributions only from source G.

In the above discussion, the number of spectral sources is two (e.g., F and G). In general, however, unmixing techniques are not restricted to any particular number of sources. For example, a sample can generally contain N different spectral sources. If the number of wavelengths at which data is collected is M—that is, $k=1 \ldots M$—then matrix E is an $M \times N$ matrix instead of an $M \times 2$ matrix, as in the above discussion. The unmixing algorithm can then be employed in the same manner as described above to isolate specific contributions at each pixel location in an image from each of the N spectral eigenstates.

One factor which can limit the ability of the algorithm to distinguish between contributions from different spectral eigenstates is the degree of spectral distinction between the eigenstates. The correlation between two spectra, such as two spectral eigenstates $I_1$ and $I_2$, can be described by a spectral angle $\theta$ where $$\theta = \cos^{-1}\left[\frac{I_1 \cdot I_2}{|I_1||I_2|}\right] \qquad (4)$$

Sets of spectra for which $\theta$ is small for two members are not as easily separated into their components. Physically, the reason for this is easily understood: if two spectra are only marginally different, it is harder to determine the relative abundance of each.

A number of techniques can be used to measure or estimate the pure spectra of the spectral sources F and G (and other spectral sources, where the sample includes more than two). In general, any method that yields spectral eigenstates of sufficient accuracy can be used. Some samples can contain spectral sources such as dyes, fluorescence labels, or other chemical moieties for which there are known spectra available in published reference materials. Alternatively, it may be possible to directly measure the spectra of source components using one or more measurement systems. In some samples, a particular region of the sample may be known to include only one particular spectral source, and the spectrum of that source can be extracted from measurements taken on only the identified region of the sample.

Various data analysis techniques can also be used for determining component spectra for spectral unmixing, such as principal component analysis (PCA), which identifies the most orthogonal spectral eigenvectors from an image cube and yields score images showing the weighting of each eigenvector throughout the image. This may be done in combination with other mathematical processing, and there are other known techniques for identifying low-dimensionality spectral vectors, such as projection pursuit, a technique described, for example, in L. Jimenez and D. Landgrebe, "Hyperspectral Data Analysis and Feature Reduction Via Projection Pursuit", *IEEE Transactions on Geoscience and Remote Sensing*, Vol. 37, No. 6, pp. 2653-2667, November 1999, the entire contents of which are incorporated herein by reference. Other techniques include independent component analysis (ICA) and end-member detection algorithms, for example.

These techniques are typically not well-suited to the applications in the life sciences. For example, some techniques are optimized for spectral imaging data sets that contain spectra with dense spectral shapes and well-defined narrow peaks. In some techniques the spectral ranges are large compared to the individual spectral features and peaks that are used for analysis. The presence of peaks, or the ratio of peaks, may be then used to classify "end-members" to be separated. Typically, the components in biological samples do not have well-defined, narrow peaks.

Some of these techniques generate images related to spectra that are present in a pure form somewhere within the original image cube. In many cases in the life sciences, signal spectra present in the image cube are mixtures of components. If the component of interest is not in a pure form somewhere in the original image cube, then it is unlikely that these techniques will generate an image that accurately represents the abundance of the component of interest. There are some techniques, sometimes called "convex-hull" algorithms, that estimate what the true end-members are even if they do not exist in a pure form in the image, but the effectiveness is dependent on how close signal spectra in the image cube are to the end-members.

One technique that can be used to extract spectral eigenstates (or representations thereof) without a priori knowledge of all of the eigenstates involves considering the signal spectrum $S(\lambda_k)$ for a given pixel, and subtracting from it the maximum amount of a first spectral source $F(\lambda_k)$ while leaving the remaining signal that is positive definite in all spectral channels. That is, one defines a so-called "remainder spectrum" $U_a(\lambda_k)$ for each pixel as $$U_a(\lambda_k) = S(\lambda_k) - aF(\lambda_k) \qquad (5)$$

and then selects the largest value of the parameter a consistent with $U_a(\lambda_k)$ having a non-negative value in every spectral channel. The resulting spectrum $U_a(\lambda_k)$ is then used as the signal spectrum, expunged of contributions due to first spectral source F. One may also make the determination of parameter a based not on the strict non-negative criterion listed above, but on some related criterion that incorporates a small negative distribution to account for considerations such as shot noise or detector noise in a measurement system. Additional examples of optimization criteria for removing the maximal amount of spectral source F include using different error functions.

Alternatively, one may seek to extract a contribution to a measured spectrum that is due to second spectral source G. In analogy with Equation (5), the remainder spectrum can be calculated for each pixel as $$U_b(\lambda_k) = S(\lambda_k) - bG(\lambda_k) \qquad (6)$$

where one selects the largest value of the parameter b consistent with $U_b(\lambda_k)$ having a non-negative value in every spectral channel.

The remainder technique can be expanded to cases where the spectra for one or more additional components of the sample are known, and one wants to remove their contributions to the signal. In such cases, the remainder spectrum is written to subtract a contribution of each such component from the observed signal based on the additional spectra and consistent with a positive remainder in each spectral channel.

Additional spectral unmixing techniques are described in PCT Patent Application Publication No. WO2005/040769 entitled "SPECTRAL IMAGING OF BIOLOGICAL SAMPLES," the entire contents of which are incorporated herein by reference.

In order for the spectral unmixing techniques disclosed herein to effectively separate contributions in sample images that are due to different spectral eigenstates, Equation (1) should be at least approximately correct. That is, the measured spectral data should be approximately described as a linear superposition of weighted eigenstates. This approximation holds for many samples and spectral measurement techniques, especially darkfield measurement techniques. For example, sample images arising from fluorescent or luminescent chemical labels within the sample typically satisfy the linearity assumption.

In some cases however, such as for some brightfield measurement techniques, the linearity approximation may not be satisfied. For example, when images are captured that arise from illumination light that is transmitted through a sample that includes light-absorbing components, the linearity assumption in Equation (1) may not be correct. Instead, the intensity of the measured light may be reduced with an exponential dependence on the concentration of the light-absorbing components. In such cases, the spectral images can be transformed before spectral unmixing techniques are used. As an example, for sample images measured in a transmission mode, the measured image intensities can be transformed into optical densities (e.g., by applying a logarithmic function) to apply linear unmixing techniques. Optical density techniques and transformations are further described, for example, in U.S. Patent Application Publication No. US 2003/0081204 entitled "SPECTRAL IMAGING," the entire contents of which are incorporated herein by reference.

Overlapping Unmixing

Spectral unmixing allows detection and isolation of relatively weak components in spectral images, in the presence of much stronger components, and to identify components with relatively subtle differences in their spectral contributions to an image cube. In many implementations, spectral unmixing is performed following acquisition of an image cube that includes multiple spectral images of a sample. Because acquiring an entire image cube can be time consuming, and because unmixing an entire image cube can also be computationally intensive and therefore time consuming, a system operator performing spectral imaging experiments on a sample may have to wait for some time between successive sample measurements before updated component images are available as a result of spectral unmixing operations.

During operation, component images are typically obtained in subsequent experiments and/or at later time intervals (e.g., when a sample is undergoing time-series imaging) by re-acquiring all of the spectral images to form a new image cube, and then unmixing the new image cube to obtain new component images. As an alternative to such methods, however, component images can be determined much more frequently by using overlapping unmixing techniques. In such techniques, only a portion of the new image cube is newly measured, while the remainder of the new image cube is derived from the old image cube. Thus, a portion of the data used to form the new image cube "overlaps" with corresponding portions of the previous image cube. As such, the new image cube is obtained much quicker than would otherwise be possible if an entire new image cube was measured; accordingly, updated component images derived from the new image cube via unmixing can also be obtained more quickly. Thus, overlapping unmixing permits a system operator to obtain and view component images corresponding to a sample much more frequently than would otherwise be possible under standard (e.g., full re-acquisition of image cube) spectral unmixing techniques.

Figure 2A:
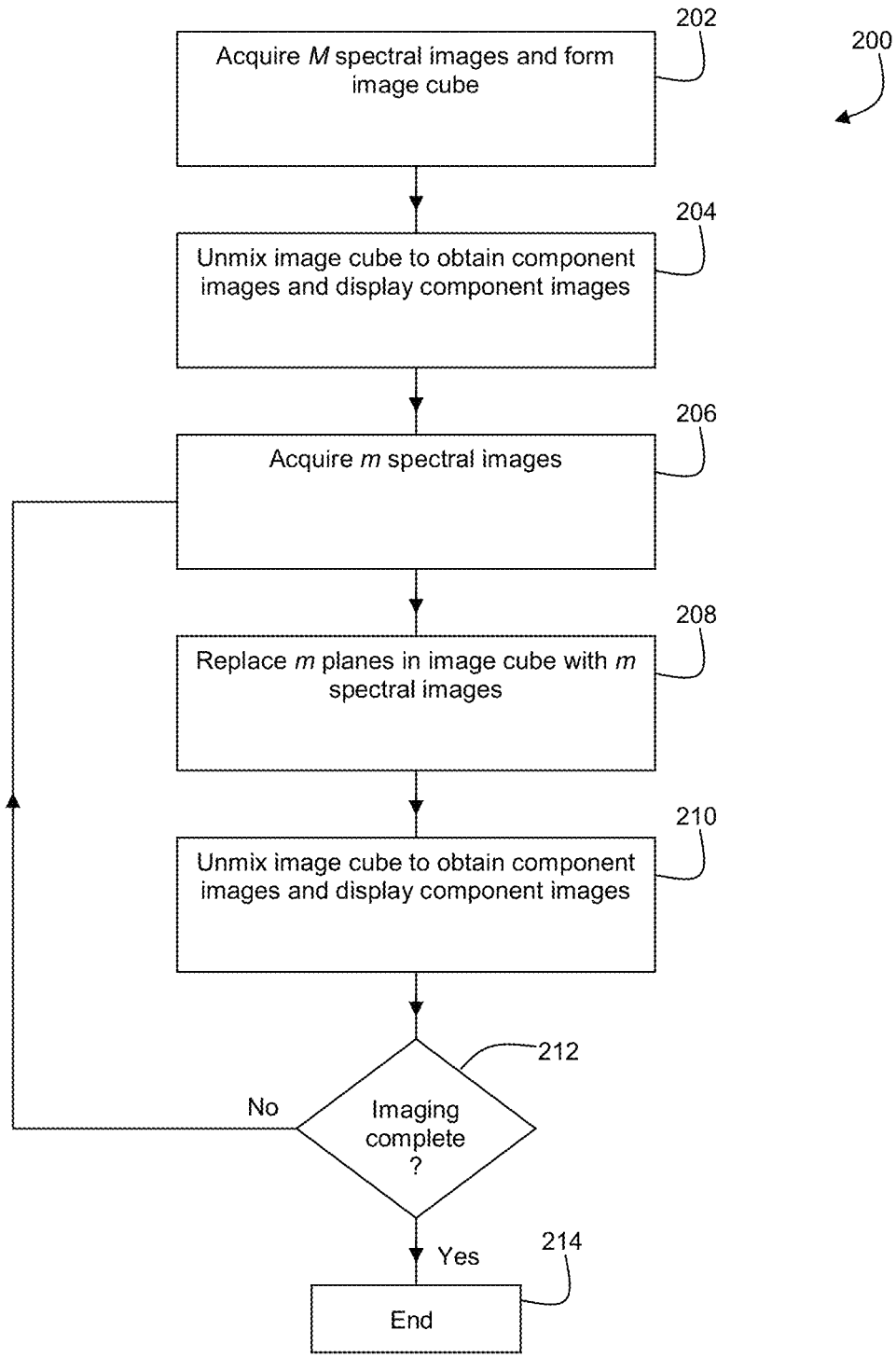
FIG. 2A is a flow chart showing steps in an overlapping unmixing procedure.

Overlapping unmixing techniques can be implemented in a wide variety of different ways. FIG. 2A shows a flow chart 200 of an embodiment of a procedure for incremental spectral unmixing. In the procedure shown in flow chart 200, an image cube with M spectral images (e.g., M spectral planes, each corresponding to a different wavelength of illumination light or emitted light from the sample) is used to derive information about components in a sample. In first step 202, M spectral images of the sample are acquired and used to form the image cube of spectral information relating to the sample. The image cube is stored in a memory unit or on a storage medium, for example. Then, in optional step 204, the image cube is unmixed to obtain one or more component images. Further, optionally, the one or more component images can be displayed to a system operator (e.g., via user interface 120) to permit the system operator to take further action based on the component images, including initiating further processing of the spectral information.

In step 206, the implementation of overlapping unmixing begins by acquiring m new spectral images of the sample, where m<M. Typically, for example, m is a relatively small number of new spectral images (e.g., m=1, m=2, m=3, m=4, m=5, m=10, m>10). After these new images are obtained, they are introduced into the stored image cube in step 208. In some embodiments, for example, the new spectral images can be introduced into the stored image cube by replacing older planes corresponding to the same spectral index. For example, each of the M planes in the image cube can correspond to a different wavelength of illumination light or emitted light. In step 202, M images of the sample corresponding to all selected wavelengths are measured and used to form the image cube. In step 206, m sample images—each image corresponding to one of the M wavelengths—are obtained. Then, in step 208, the m newly obtained sample images replace m older images in the image cube that correspond to the same wavelengths. In this manner, the procedure maintains an image cube with M total planes, but some of the M planes (corresponding to sample images) have been measured more recently than others.

More generally, however, the M planes in the image cube correspond to different spectral weighting functions. A spectral weighting function, as used herein, is a spectral distribution of either the radiation used to illuminate the sample (when the spectral properties of the illumination radiation are adjusted for each image plane) or the radiation detected from the sample (when the radiation from the sample is filtered to select a particular wavelength distribution). Typically, the spectral weighting function is adjusted by re-configuring spectral filtering elements in the path of either the illumination radiation or the radiation from the sample.

Next, in optional step 210, the image cube with some of its planes updated is unmixed, and new component images are obtained. Unmixing can include a full unmixing operation as described in Equation (3), for example. Alternatively, unmixing can include one or more incremental unmixing operations, as discussed later. The new component images can be displayed to a system operator via user interface 120. In step 212, the procedure determines (e.g., via input from the system operator, or via a temporal counter, or through another indicator) whether sample imaging should continue. If the procedure continues, control returns to step 206 where m additional sample images (where m can differ from one iteration to the next) are obtained and incorporated into the image cube. Alternatively, if the procedure does not continue, control terminates at step 214.

By using the procedure shown in flow chart 200, new sample images can be continually acquired, and the image cube can be updated with new information while at the same time maintaining a total of M planes in the image cube. If m=1, the image cube can be unmixed each time a new sample image is acquired (e.g., at a particular corresponding wavelength), yielding new component images for the sample. By using an overlapping approach to updating the image cube, new component images can be obtained after every sample image is acquired, rather than after every M sample images are acquired. As a result, the rate at which new component images are obtained and displayed to the system operator is significantly increased.

When m=1, the image cube at any instant includes M planes, of which M−1 planes are indicative of the sample condition at varying times in the past, and one plane is indicative of the sample condition most recently. When the sample's properties change as a function of time (e.g., so that the spatial information in the sample images changes as a function of time)—which can occur when the sample is moved, when the imaging system focusing properties change, and/or when the sample undergoes chemical and/or biological changes—certain planes in the image cube may not reflect entirely accurate spatial information regarding the sample's current state. As a result, component images derived from the image cube can include artifacts that arise due to differences in spatial information among the planes. As the optical properties of the sample stabilize, however (e.g., the sample comes to rest in a new position relative to the imaging system, and/or biological and/or chemical changes occur less rapidly), these artifacts become weaker as subsequent sample images are acquired that reflect the sample's new state. In principle, if the sample remains essentially stable in its new state, the artifacts vanish substantially no later than after M new sample images have been acquired, each of the new images replacing one of the older M planes in the image cube.

These artifacts can be referred to as latency effects, since a temporal latency exists between changes in the sample's state and the substantial disappearance of imaging artifacts in component images obtained from the image cube. As a system operator works interactively with a sample (e.g., by moving the sample relative to the imaging system), component images derived from the image cube do not necessarily instantly reflect the new sample state. Instead, as the individual planes of the image cube are updated and new component images derived from the image cube, the newly derived component images gradually come to reflect the new sample state. After an additional M−1 sample images have been obtained (following the initially obtained sample image after the change in the sample), the image cube fully reflects the new state of the sample and component images derived therefrom also reflect the new sample state. This latency occurs regardless of the particular wavelength band(s) to which the component images correspond and regardless of the wavelength of the sample image that is acquired when the sample first reaches its new state. However, as the state of the sample changes, the imaging system can immediately begin to provide updated component images for the sample, which are updated frequently and become increasingly accurate on each update cycle. As a result, the imaging system responsiveness is significantly higher than it would otherwise be if all M planes of the image cube were replaced before new component images were obtained.

Incremental Unmixing Operations

As discussed above, in some embodiments, only some of the planes in an image cube may have changed since the last unmixing operation occurred. Accordingly, Equation (3) can be adjusted to take account of this fact, and thereby to implement incremental unmixing operations to obtain new component estimates.

For example, suppose that m=1 so that on each image acquisition cycle, only the k-th plane corresponding to the k-th wavelength component of the image cube is replaced. With an initial estimate A of a particular component of the sample based on a measured spectrum S, a revised estimate for A can be obtained based on changes in the measured spectrum at just the k-th wavelength $\lambda_k$, as follows:

$$A_{revised} = A_{initial} + E_k^{-1}(S_{k,revised} - S_{k,initial}) \quad (7)$$

In Equation (7), $A_{revised}$ is the revised estimate for A, $A_{initial}$ is the initial estimate for A, the difference $S_{k,revised} - S_{k,initial}$ corresponds to the difference in the measured spectrum at the k-th wavelength, and $E_k^{-1}$ is the k-th column of the inverted matrix of eigenstates. Equation (7) can be simplified as $$\delta A = E_k^{-1} \cdot \delta S_k \quad (8)$$

where $\delta A = (A_{revised} - A_{initial})$ and $\delta S_k = (S_{k,revised} - S_{k,\ initial})$. Using Equations (7) and (8), an updated component image based on changes in only one plane of the image cube can be rapidly calculated without performing a full unmixing operation on the entire image cube. Considerably fewer calculations are performed in such incremental unmixing operations relative to full unmixing, enabling near real-time and even real time determination and display of component images.

For example, where there are N components of interest in a sample, evaluation of the right hand side of Equation (8) includes performing one subtraction and N multiplications, while updating A on the left hand side includes performing N additions. By comparison, performing a complete unmixing operation on an image cube with M planes involves N×M multiplications and additions. The number of planes in the image cube, M, is larger than the number of component images derived from the image cube, N. Typically, for example, M is in a range from about 5 to about 20, and N is in a range from about 2 to about 5. More generally, however, M can be 2 or more (e.g., 5 or more, 10 or more, 20 or more, 100 or more, or even more) and N can be 1 or more (e.g., 2 or more, 3 or more, 4 or more, 5 or more, or even more).

With M and N falling within the typical ranges discussed above, an improvement in the rate at which component images can be obtained from the image cube by a factor of between 5 and 20 can be achieved, relative to a full unmixing operation performed on the image cube. Thus, using incremental unmixing operations can increase the overall update speed and responsiveness of the imaging system while at the same time reducing the overall computational burden.

In some embodiments, Equation (8) can be implemented using null initial estimates for both A and S (e.g., $A_{initial}=0$ and $S_{k,initial}=0$). This initial condition is equivalent to not performing an initial unmixing operation. As each plane of the image cube is acquired, the estimate of A is refined according to Equations (7) and (8), so that an estimate that is accurate to the limits of precision of the measured spectral data is obtained when all M planes of the image cube have been acquired once. Thereafter, updated estimates of A can be obtained as new planes replace older corresponding planes in the image cube, providing rapidly updating estimates of component A as changes in the sample state occur.

To perform incremental unmixing operations, control system 114 calculates the quantity $\delta S_k = (S_{k,revised} - S_{k,initial})$ when a new sample image is acquired. During the calculation, a total of M+1 planes (the M planes of the image cube, and the new sample image) are stored in a memory unit attached to control system 114. Following the incremental unmixing operations, the new sample image is stored in the image cube and replaces a corresponding older plane, so that the image cube retains its complement of M planes.

A series of experiments were performed to investigate the application of the methods and systems disclosed herein. In a first experiment, a specimen of human tonsil tissue was stained and then imaged. The specimen had a thickness of approximately 5 microns, and was stained with hematoxylin, DAB, and fast red. Techniques for excision, fixation, blocking, and sectioning of tissue samples that are well known in the art of histological preparation, and well known methods and protocols for applying histological stains, immunofluorescent labels, and immunohistological stains, were used to prepare the specimen.

Figure 3:
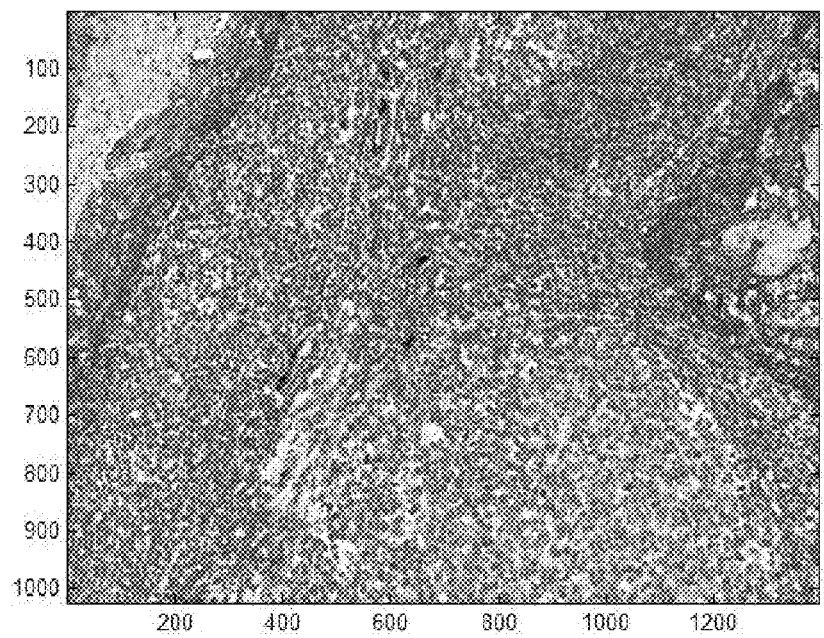
FIG. 3 is an image of a stained human tonsil tissue sample.

Spectral images of the specimen were acquired at a variety of wavelengths and used to form an image cube. FIG. 3 shows an image of the stained sample obtained at a measurement wavelength of 550 nm. Images used to form the image cube were acquired at 14 different wavelengths from 430 nm to 690 nm in 20 nm steps. Each image had a spatial resolution of 1040×1392 pixels. Images were acquired using a Nuance FX instrument (available from Cambridge Research and Instrumentation, Woburn, Mass.) and an Olympus BX61 microscope with a 20× plan apochromat objective. Nuance version 2.10 software was used to acquire the specimen images and perform optical density calculations. The images were converted to optical density units by dividing each image with a reference image (with no sample present) to obtain an estimate of transmitted light intensity, and then applying a logarithmic transformation of the divided images. Reference spectra associated with each of the N=3 sample components (e.g., hematoxylin, DAB, and fast red) were obtained by measuring spectra of different sample regions, each of which contained only one of the three components. Normalized spectra in units of optical density for each of the components are provided in Table 1.

A full unmixing operation was performed on the image cube with M=14 planes. From this operation, estimates for each of the three specimen components were derived and stored. Then, an incremental unmixing operations were performed beginning with initial estimates A=0 and S=0; individual planes at each wavelength $\lambda_k$ were used in the incremental unmixing calculations. The incremental unmixing operations were performed with MATLAB 7.1 software (available from The Mathworks, Natick, Mass.) using single-precision arithmetic. When all 14 wavelength planes in the image cube were processed, component estimates A were obtained and compared to the estimates obtained from the full unmixing operation.

Figure 4A:
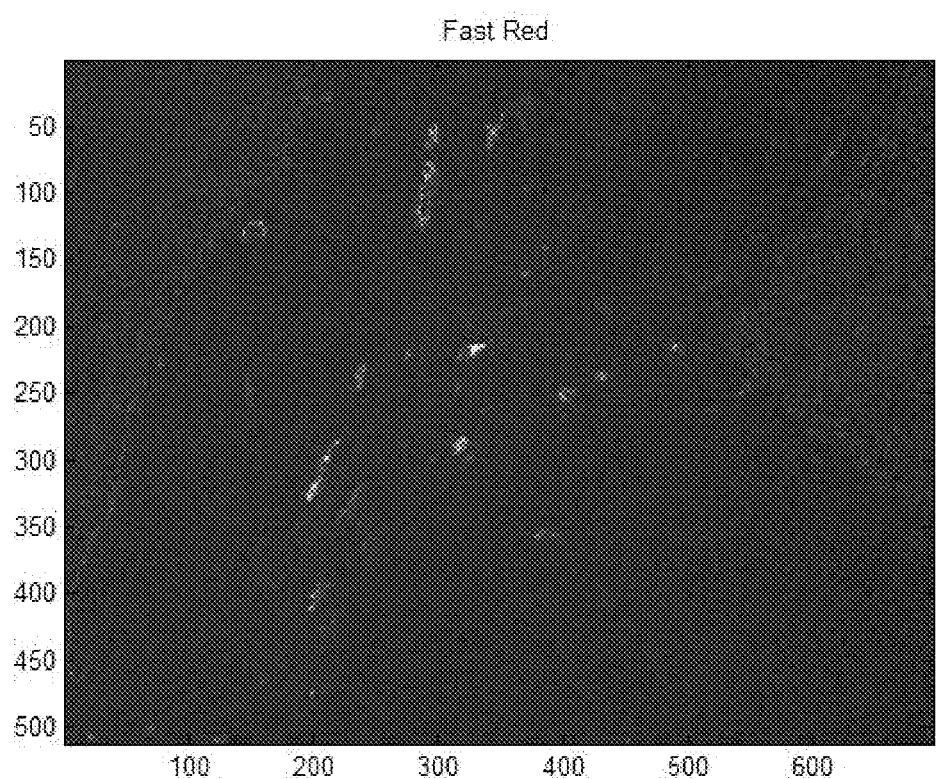
FIGS. 4A-4C are component images for the sample in FIG. 3 by performing a full unmixing of an image cube.
Figure 4B:
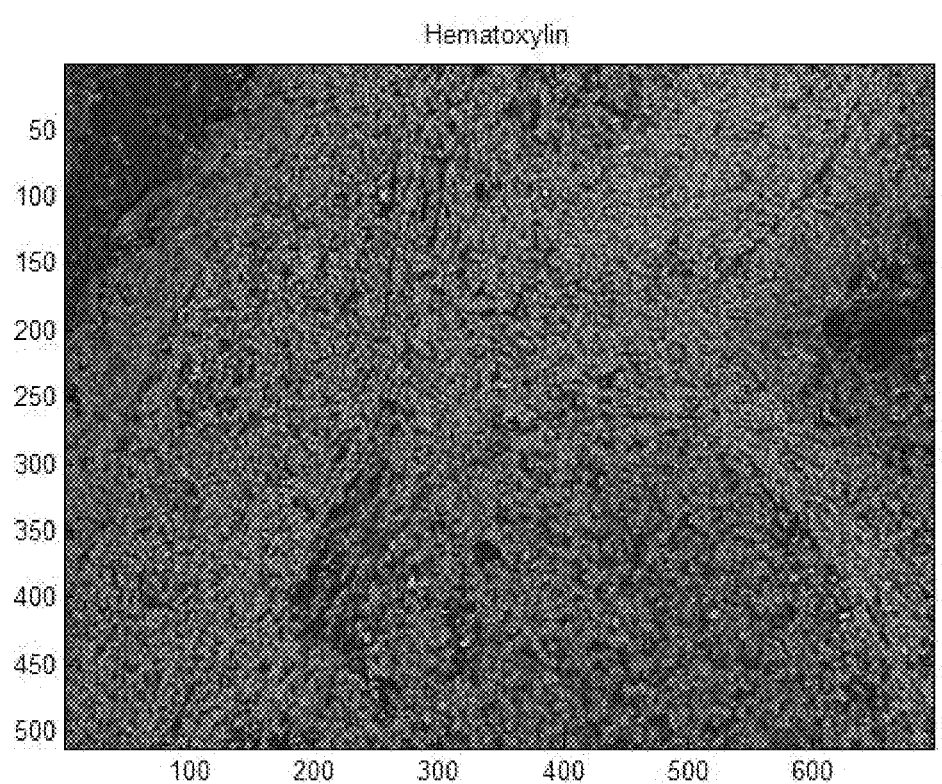
Figure 4C:
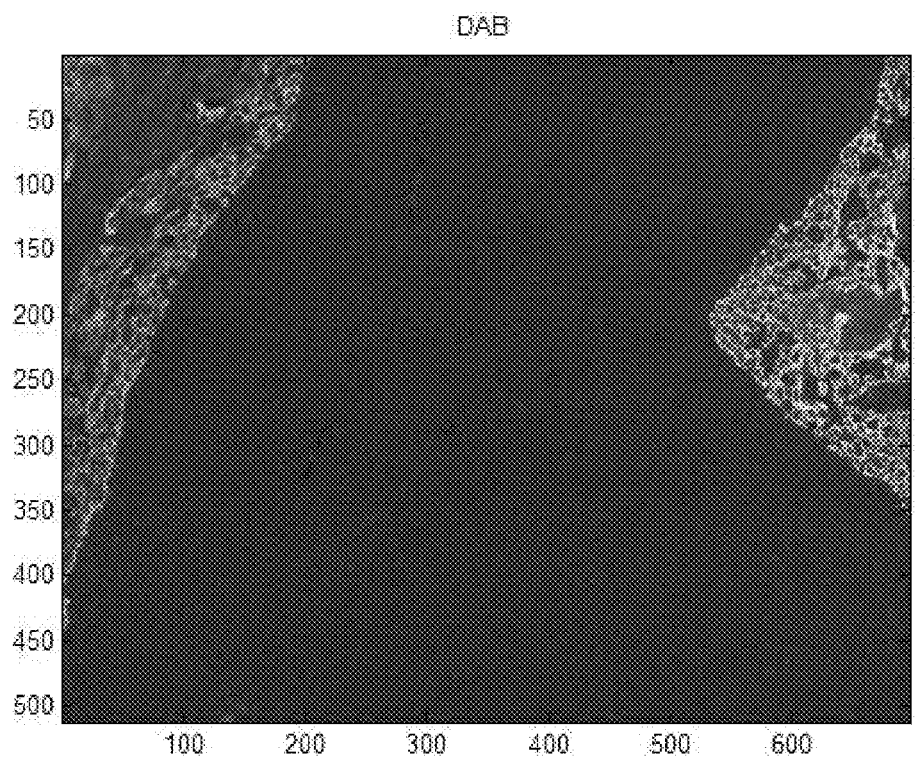
Figure 5A:
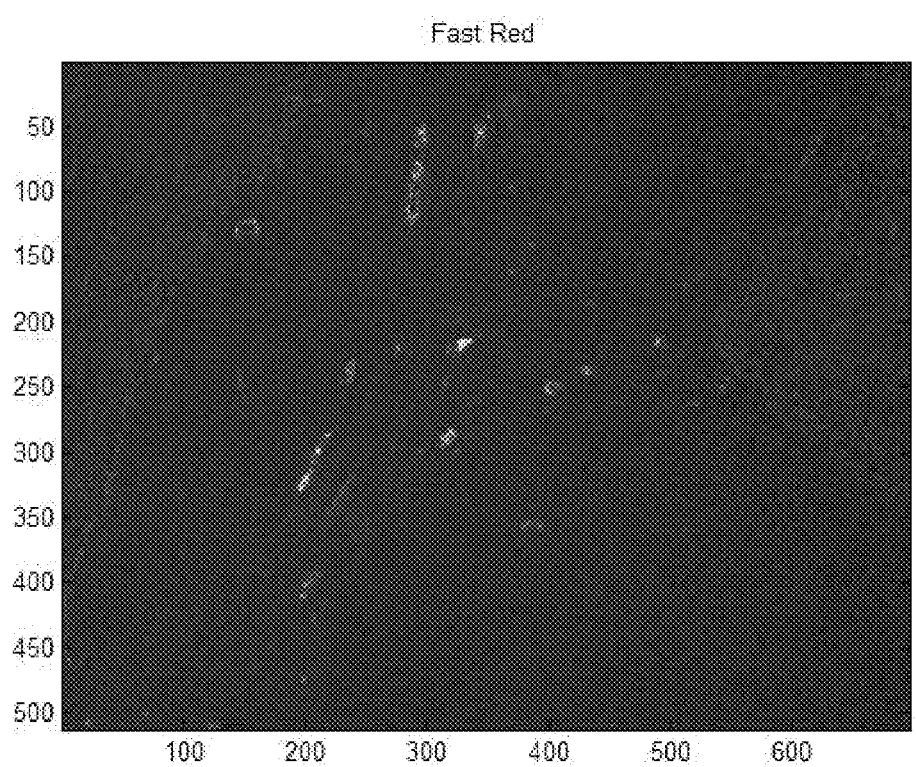
FIGS. 5A-5C are component images derived for the sample in FIG. 3 by performing incremental unmixing operations.
Figure 5B:
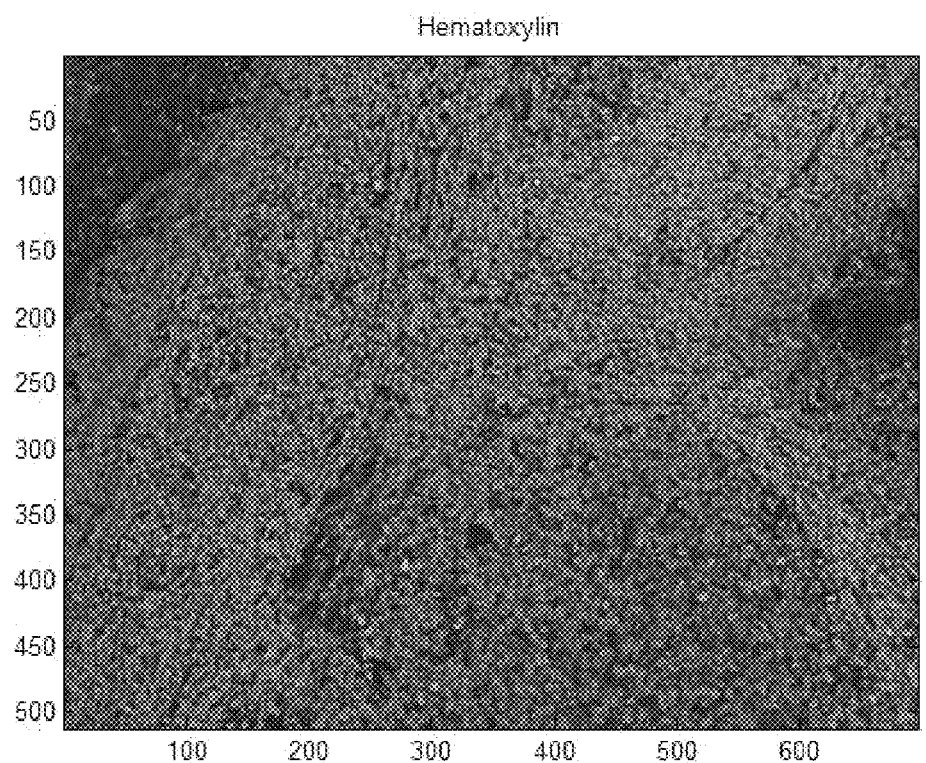
Figure 5C:
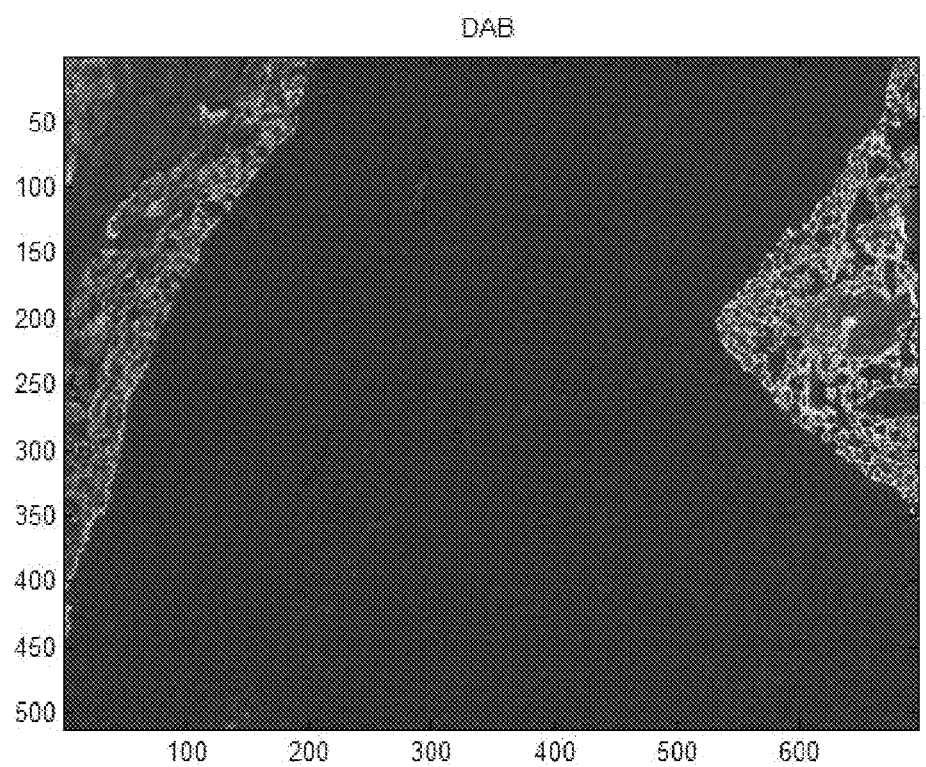

FIGS. 4A-4C show component images derived from the full unmixing operation, and FIGS. 5A-5C show component images derived from the incremental unmixing operations. No differences were apparent visually between the corresponding component images, leading to the conclusion that incremental unmixing operations yield component images with information that is similar to (or even substantially identical to) information in component images derived from full unmixing of an image cube.

TABLE 1

| Wavelength (nm) | Hematoxylin | Fast Red | DAB |
|---|---|---|---|
| 430 | 0.6424 | 0.1488 | 0.7878 |
| 450 | 0.6427 | 0.1529 | 0.8027 |
| 470 | 0.6810 | 0.1876 | 0.7425 |
| 490 | 0.8434 | 0.2630 | 0.6721 |
| 510 | 1.0225 | 0.3408 | 0.5633 |
| 530 | 1.1084 | 0.4150 | 0.4698 |
| 550 | 1.1054 | 0.4797 | 0.3867 |
| 570 | 0.8768 | 0.5261 | 0.3440 |
| 590 | 0.3825 | 0.5496 | 0.2978 |
| 610 | 0.1619 | 0.5460 | 0.2601 |
| 630 | 0.0766 | 0.4774 | 0.2155 |
| 650 | 0.0496 | 0.3475 | 0.1867 |
| 670 | 0.0251 | 0.2471 | 0.1478 |
| 690 | 0.0097 | 0.1603 | 0.1293 |

Incremental unmixing operations can be particularly efficient and accurate when the combination of contributions to the measured sample spectral information is well described by a linear superposition of contributions from different sample components, as described by Equations (3), (7), and (8). As FIGS. 4A-4C and 5A-5C show, the results obtained in this situation from incremental unmixing operations are nearly the same as those obtained from full unmixing of an image cube. When the incremental unmixing operations are performed with limited precision (e.g., using 32-bit IEEE floating point numerical representation), numerical errors due to round-off and other inaccuracies can accumulate. While these errors are typically small compared with the inherent uncertainties associated with spectral measurements, the errors accumulate as each successive sample image is acquired and replaces a plane in the image cube in incremental unmixing operations. Accordingly, it is not inconceivable that over a prolonged period, such errors might accumulate to levels that are no longer negligible.

Figure 2B:
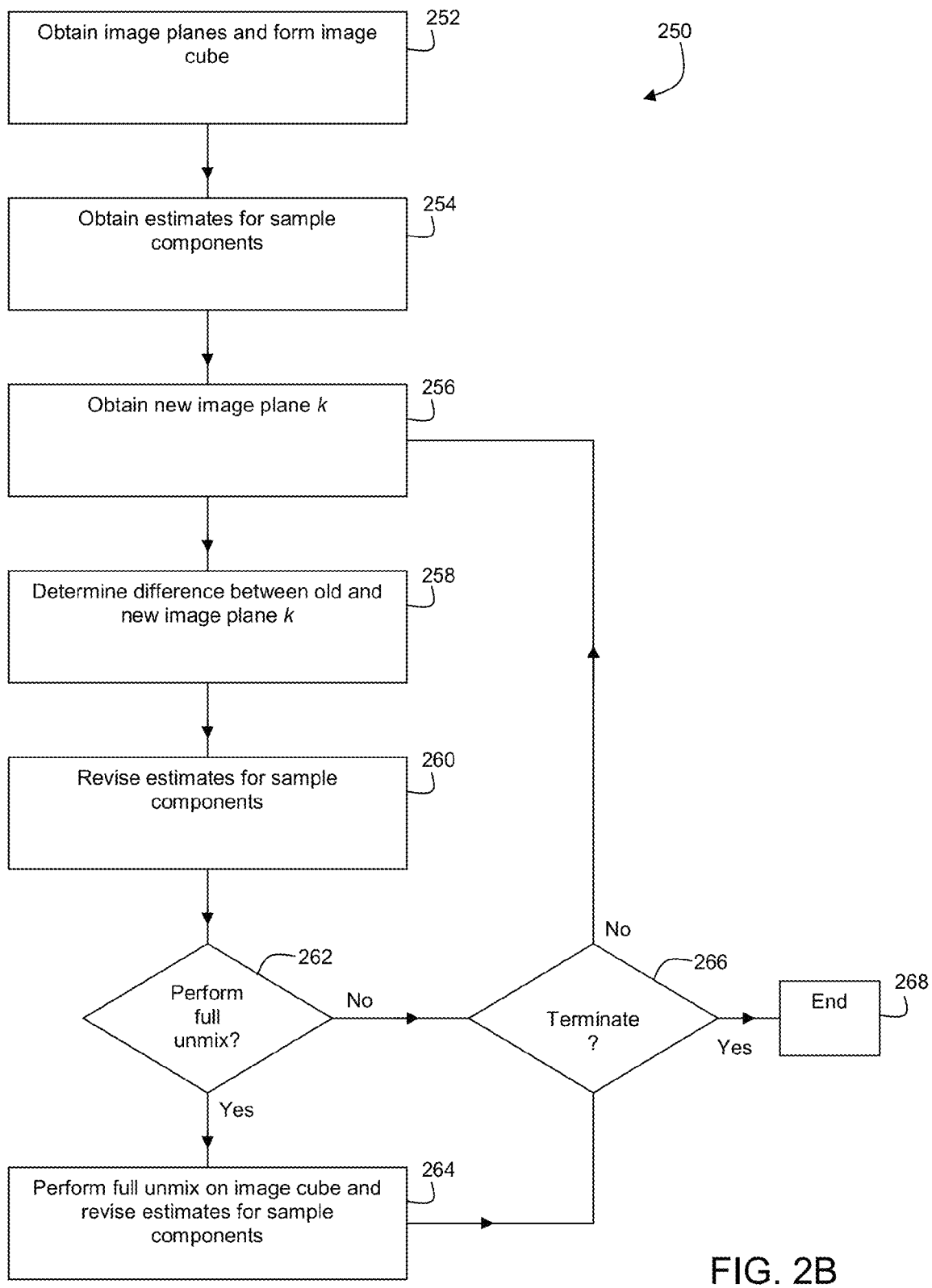
FIG. 2B is a flow chart showing steps in a procedure that can include both incremental unmixing operations and full unmixing of an image cube.

To reduce or eliminate the effects of accumulated errors, full unmixing can be interleaved with incremental unmixing operations at periodic intervals to reduce the magnitude of errors that are carried forward. In particular, by performing a full unmixing, accumulated errors are effectively reduced to zero; the errors that remain in the component estimates following a full unmixing are due to measurement errors and other systemic errors. FIG. 2B is a flow chart 250 that includes a series of steps in an embodiment of a procedure for performing both incremental unmixing operations and full unmixing on an image cube. In a first step 252, a plurality of image planes are obtained and an image cube is formed, as discussed previously. Then, in step 254, estimates for each of the sample components are obtained. The estimates can be obtained, for example, by unmixing the image cube formed in step 252. Alternatively, the estimates can simply correspond to null initial conditions.

In step 256, a new image plane k (e.g., the k-th plane of the image cube) is acquired. The difference between the old k-th plane in the image cube and the newly obtained k-th plane is determined in step 258, and then revised estimates for one or more of the sample components are obtained in step 260 by implementing the incremental unmixing operations discussed above. After the revised estimates have been obtained, a decision as to whether to perform a full unmixing of the image cube occurs in step 262. The decision can be based, for example, on the number of image planes obtained, the number of incremental unmixing operations performed, the elapsed time since the last full unmixing, and/or on input from a system operator. If a full unmixing is not performed, control passes directly to decision step 266. Alternatively, if a full unmixing is to be performed, control passes to step 264, in which the full unmixing of the image cube occurs, and the component estimates obtained from the full unmixing are used to replace the stored component estimates derived from the incremental unmixing operations. Control then passes to decision step 266.

In decision step 266, if no further imaging of the sample is desired, then control passes to step 268, where the procedure ends. Alternatively, if imaging of the sample is to continue, control passes to step 256, where another new image plane is obtained and integrated into the image cube.

To estimate the effects of error accumulation in incremental unmixing operations, a second experiment was performed in which incremental unmixing operations were used to estimate contributions from components in the sample shown in FIG. 3. Three different image cubes of spectral information were acquired from adjacent regions of the stained human tonsil specimen. The same imaging apparatus and optical density conversion discussed above were used to acquire and process each of the image cubes. Initial estimates A=0 and S=0 were used as starting conditions to determine estimates of the three components hematoxylin, DAB, and fast red in the sample.

Incremental unmixing operations were performed for all M planes of the first image cube in sequence. Then, incremental unmixing operations were performed for all M planes of the second image cube in turn. Finally, incremental unmixing operations were performed in sequence for all of the planes of the third image cube. Overall, a total of 56 incremental unmixing operations were performed. Successive component images corresponding to each of the three components in the specimen were derived from these unmixing operations. Then, full unmixing was performed on each of the three image cubes, and component images derived from the full unmixing operations were compared against the component images derived from the incremental unmixing operations. Qualitative visual comparisons between the corresponding component images yielded no apparent differences. Quantitative comparisons between corresponding component images revealed that discrepancies between the estimates derived from full unmixing and from incremental unmixing operations were at the parts-per-million level or less.

Figure 6A:
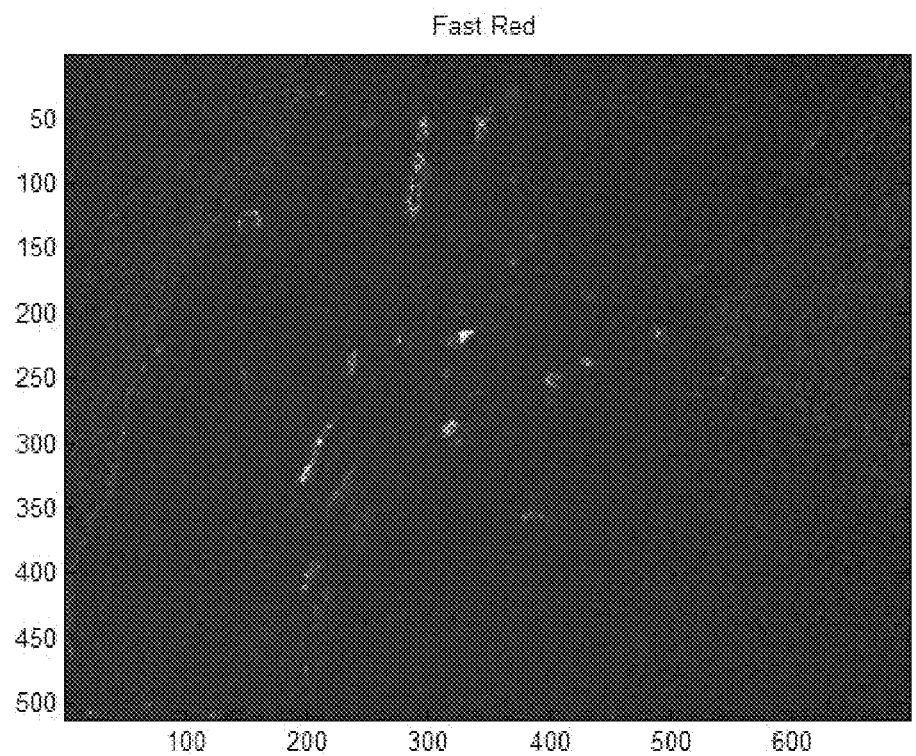
FIGS. 6A-6C are component images derived for the sample in FIG. 3 by performing 4312 incremental unmixing operations.
Figure 6B:
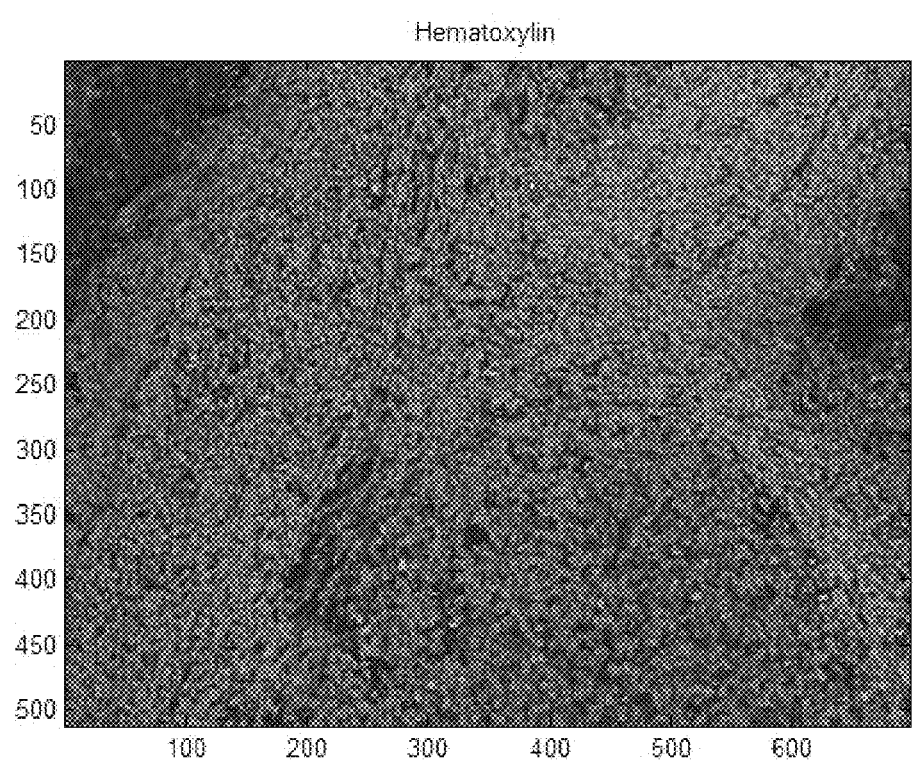
Figure 6C:
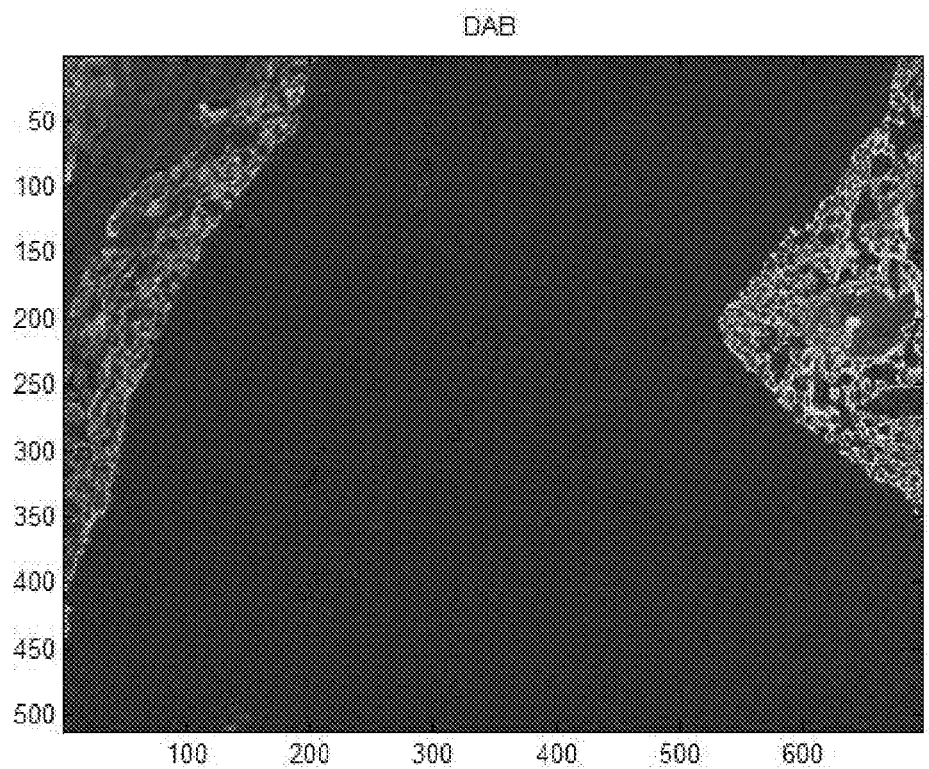

The foregoing procedure was repeated by cycling through each of the three image cubes 100 times, for a total of 4214 incremental unmixing operations. This is the same number of incremental unmixing operations that would be performed during an operating period of 140 seconds for an imaging system that acquires spectral images at a rate of 30 images per second (e.g., approximately standard video rate). For systems with slower rates of acquisition, the operations performed correspond to a longer period of operation. For example, some systems for multispectral imaging have frame rates of about 12 images per second or less. For a system that obtains images at this rate, acquiring 4214 images corresponds to approximately 350 seconds of operation. The estimates of the components in the specimen derived from 4214 incremental unmixing operations are shown in FIGS. 6A-6C. Comparing these images to the corresponding component images in FIGS. 4A-4C, no significant differences are apparent.

Based on these results, error accumulation does not appear to represent a significant problem when the sample's spectrum and/or optical properties can be accurately described as a linear superposition of contributions from different components, so that linear unmixing operations can be performed to obtain quantitative estimates of the components in the sample according to Equations (3), (7), and (8).

Nonetheless, to reduce the carry-forward of numerical errors during incremental unmixing operations, a full unmixing of the image cube can be performed at selected intervals between incremental unmixing operations to provide a new estimate for one or more of the sample components. When full unmixing is performed, the accumulated results of previous calculations are typically discarded, so that accumulated errors that arise from incremental unmixing operations are eliminated. In some embodiments, for example, one or more full unmixings of the image cube can be performed within time intervals of a selected duration (e.g., a full unmixing operation once every 10 s, once every minute, once every 5 minutes, once every 10 minutes). In certain embodiments, one or more full unmixings of the image cube can be performed after processing a particular number of planes in the image cube (e.g., after processing 50 planes or more, after processing 100 planes or more, after processing 250 planes or more, after processing 500 planes or more, after processing 1000 planes or more). In some embodiments, one or more full unmixings of the image cube can be performed after processing all planes in the image cube a selected number of times (e.g., after processing all planes in the image cube once, after processing all planes in the image cube twice, after processing all planes in the image cube three times, after processing all planes in the image cube ten times, after processing all planes in the image cube 50 times, after processing all planes in the image cube 100 times or more). Alternatively, or in addition, in certain embodiments, one or more full unmixings of the image cube can be performed at any time during the processing of the image cube at the request of a system operator.

Figure 7A:
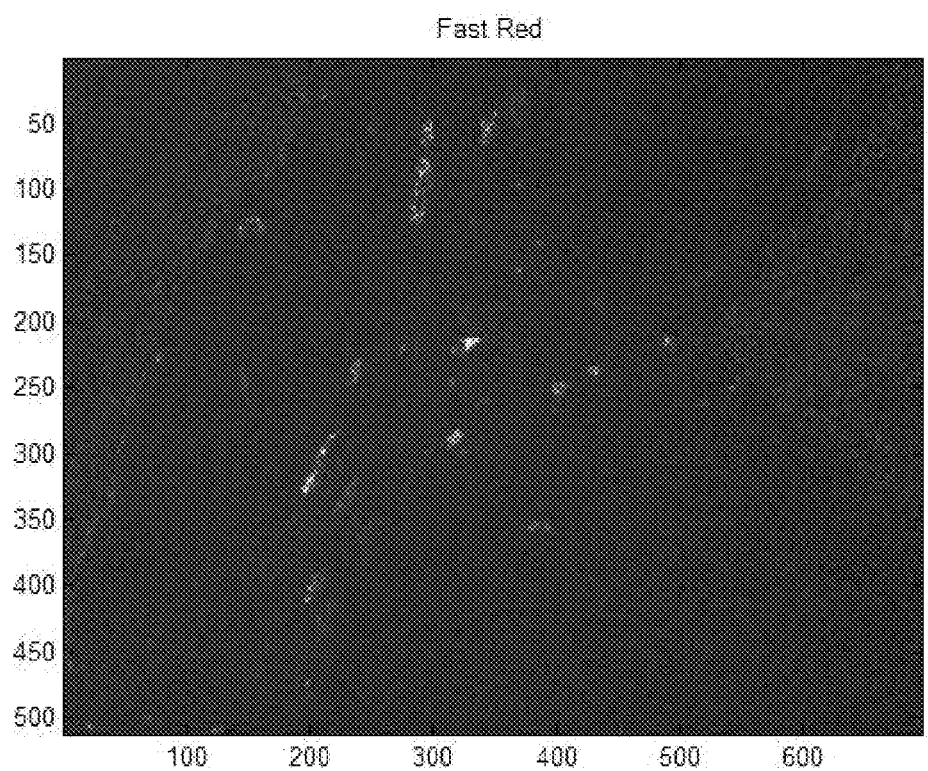
FIGS. 7A-7C are component images derived for the sample in FIG. 3 by performing a series of interleaved incremental unmixing operations and full unmixing of an image cube.
Figure 7B:
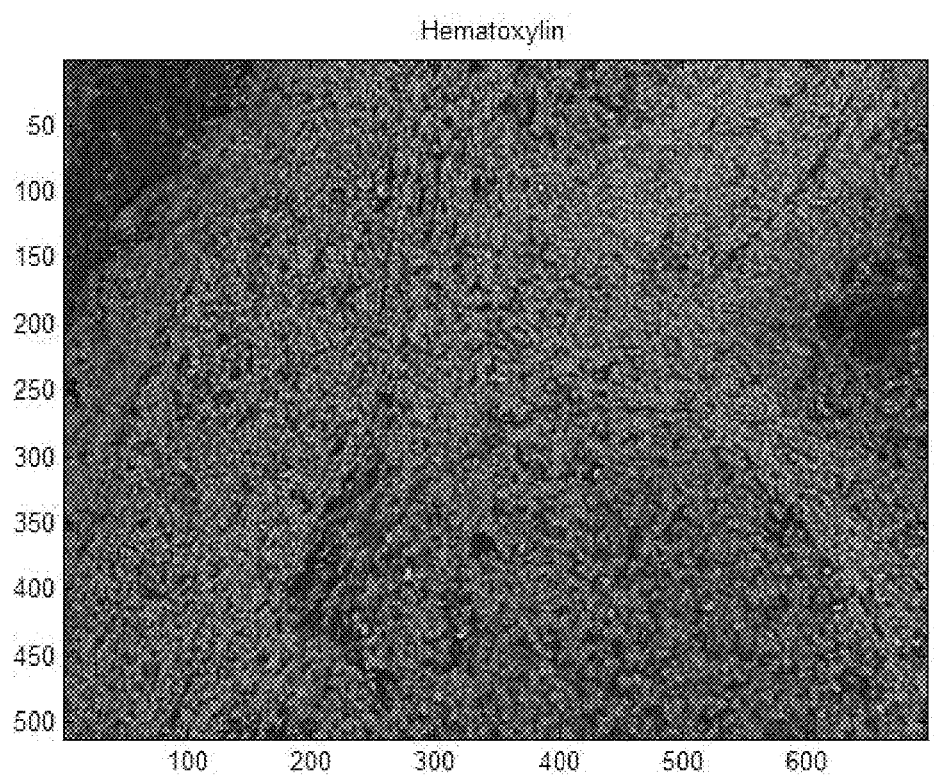
Figure 7C:
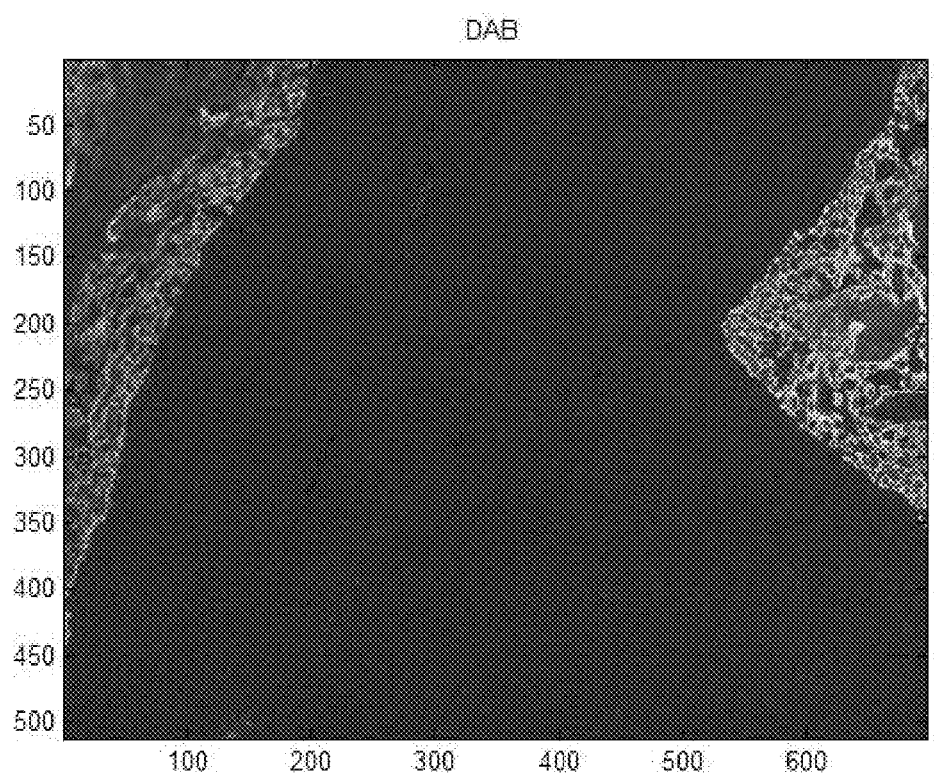

FIGS. 7A-7C show estimates of the three specimen components fast red, hematoxylin, and DAB. The component images in FIGS. 7A-7C were obtained by performing incremental unmixing operations on an image cube that included 14 planes corresponding to 14 different wavelengths. During the processing of the image cube, a full unmixing of the cube was performed after every plane in the cube was processed 60 times (e.g., after every 840 planes were processed using incremental unmixing operations). The images in FIGS. 7A-7C were obtained after all planes in the image cube were processed 600 times. The images are very similar to the images shown in FIGS. 4A-4C, demonstrating that by interleaving incremental unmixing operations and full unmixing of an image cube, accurate component estimates can be obtained with relatively small accumulated errors from the incremental unmixing operations.

A departure from the linear model for contributions to measured spectral data from specimen components as expressed by Equations (3), (7), and (8) can lead to errors when incremental unmixing operations are performed on planes of an image cube. For example, nonlinearities can arise from explicit use of nonlinear unmixing algorithms. As another example, nonlinearities can arise from non-negativity constraints (e.g., setting negative estimates for specimen components to be zero). In some embodiments, to avoid such nonlinearities, estimates of one or more components can take negative values so that the linear model described by Equations (3), (7), and (8) can be accurately implemented. If negative estimates for some or all of the components of a sample are not desired (e.g., for display purposes), separate tables can be maintained in a memory or storage unit for actual estimates of each of the components (which can have negative values), and constrained estimates of each of the components (e.g., which can be constrained to have zero or positive values only). The tables corresponding to the constrained estimates can be used for applications such as forming images of the components where negative values may be undesirable or may have no physical meaning.

As discussed above, the accuracy of the component images obtained depends in part upon whether the properties of the sample change as the sample is imaged. For example, if the sample is moved during imaging, the first component images obtained after the movement begins can include errors that arise from mismatches in spatial information among the planes in an image cube. These errors, as explained above, are associated with the phenomenon of latency. In some embodiments, it may be advantageous to reduce latency, even to the point where latency is a minimum; as a result, the imaging system is typically more highly responsive than when latency is large.

These considerations suggest that it may be advantageous to form an image cube with a sufficient number of planes M to be able to distinguish among the various components of a sample, but a small enough number of planes so that latency effects are not too significant. As a result, where the M planes of the image cube correspond to wavelengths at which spectral images of the sample are measured, the wavelengths are selected to balance the above factors. Methods for choosing suitable wavelengths for such measurements are disclosed for example, in U.S. Pat. No. 6,930,773.

In general, using fewer image cube planes (e.g., fewer wavelengths) results in a lower signal-to-noise ratio than when a larger number of planes are used, provided that the other aspects of the measurements (e.g., exposure times, detector sensitivity, number of frames integrated, bit depth) remain the same. The choice of the number of image planes to include in the image cube affects both the responsiveness of the imaging system (e.g., because the latency depends upon M) and the system's detection limit (e.g., because the signal-to-noise ratio depends upon M and upon the specific wavelengths to which the M images correspond). The imaging system can provide one or more input controls and/or parameters that a system operator can adjust to affect the balance between achieving low latency and a high signal-to-noise ratio. Further, the system can include input controls that permit the system operator to adjust the wavelengths corresponding to the planes in the image cube (e.g., to select the wavelengths at which spectral information is obtained). For example, for certain samples, the system operator might elect to include fewer image planes in the image cube to reduce latency. For other samples and/or in different conditions, the system operator might elect to include a larger number of image planes to improve the accuracy and reproducibility of the component images obtained.

Accordingly, the parameters selected to enable real-time or near real-time, continuous assessment of components in a sample can be different depending upon the nature of the sample, the desired image resolution, the desired numerical accuracy, and the preferences of the system operator. In some embodiments, the parameters selected may be similar to those selected to acquire and/or analyze static multispectral images of a sample. In certain embodiments, the parameters selected can differ from those that would be used when analyzing static images to provide improved results when the properties of the sample change during imaging. For example, in some embodiments, the image cube constructed for real-time or near real-time analysis of a sample includes only a subset of the wavelengths that would otherwise be included in an image cube used for static analysis of a sample. That is, the number of image planes (e.g., wavelengths) in the image cube, M, will be reduced to correspond to N, the number of components of interest in the sample, or to a number close to N (e.g., N+1, N+2, N+3, N+4, N+5, N+6, N+7, N+8). Equation (4), which describes the differences among component spectra in terms of a spectral angle, can be used to assist in determining how many wavelengths M and which wavelengths to include in the image cube.

Imaging Modalities

An important aspect of the systems and methods disclosed herein derives from the individual determination of the distribution of each component of interest in the sample. By separating contributions to the overall detected radiation from the sample into contributions from individual components, contributions from certain components of particular interest can be displayed or highlighted, while contributions from other components can be de-emphasized or removed from displayed images. For example, the imaging system can be configured to display only contributions (e.g., component images) corresponding to some of the N components in the sample. Such selective display methods can be useful, for example, when the system operator is investigating one or more components that may not be present everywhere in the sample. The obscuring effects of contributions from components that are not of interest can be significantly reduced.

In some embodiments, contributions from components other than those directly of interest may still be displayed, as they can serve as useful landmarks for important features in component images. For example, a system operator, while examining component images of a sample for specific features, may wish to have a view of the overall tissue structures at the same time. The imaging system can be configured to display component images either together with, or on a separate display from, images featuring the component(s) of interest, to provide the system operator with an overview of the entire sample while the operator investigates the distribution of selected components within the sample. When displaying images of the sample, one or more component images can be displayed together, e.g., by overlaying the component images. Contributions from one or more of the components can be highlighted in the overlaid images by rendering those contributions brighter than their actual brightness relative to contributions from other components in the sample. In this manner, relatively weak contributions from certain components can be displayed in a manner that makes them visible to a system operator, where they might otherwise be overwhelmed by stronger contributions from other components.

Alternatively, or in addition, in certain embodiments, contributions from different components can be displayed in different colors. When overlaid, these differently-colored contributions can achieve high visual contrast such that the spatial distribution in the sample of the different component contributions is readily perceived. For example, where two components are present in a sample and both correspond to wavelengths that are in the green region of the visual portion of the electromagnetic spectrum, contributions from the two components can be rendered in different colors (e.g., one in green, one in red) so that contributions from each of the images are more readily distinguished in the overlay images than they are in unprocessed images of the sample.

Figure 9A:
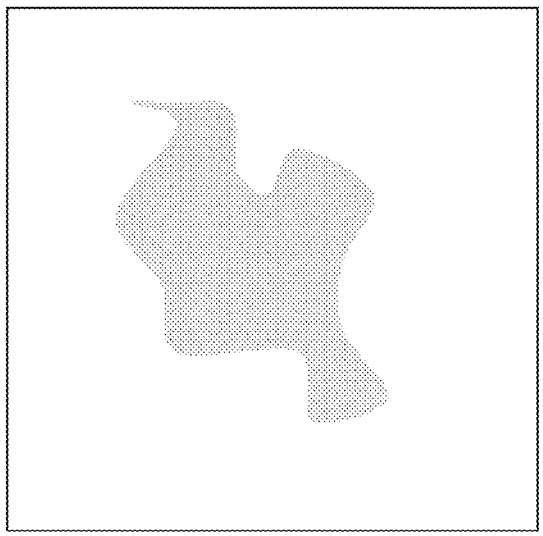
FIGS. 9A-9C show schematic component images associated with a sample.
Figure 9B:
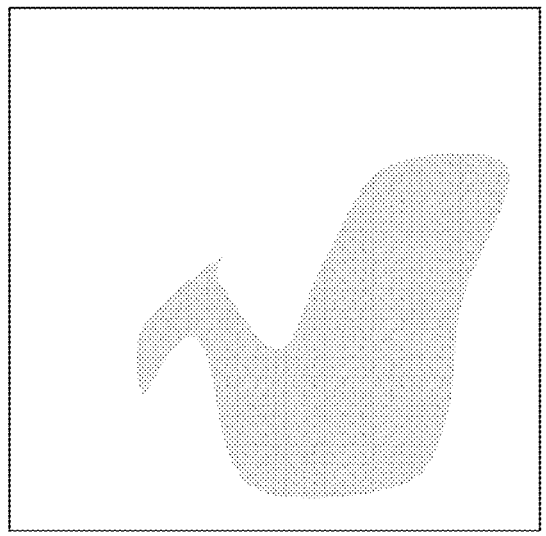
Figure 9C:
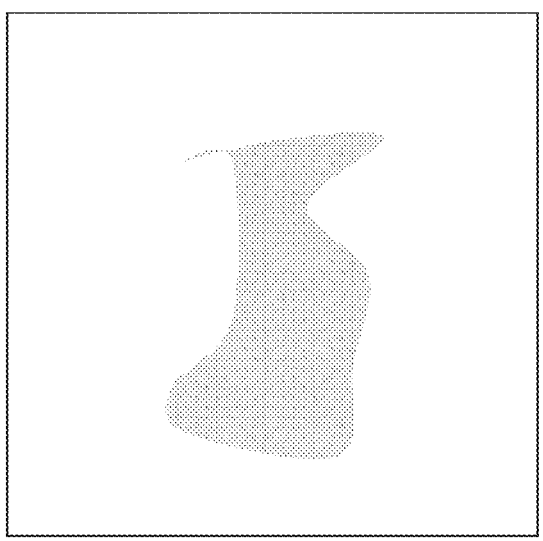
Figure 9D:
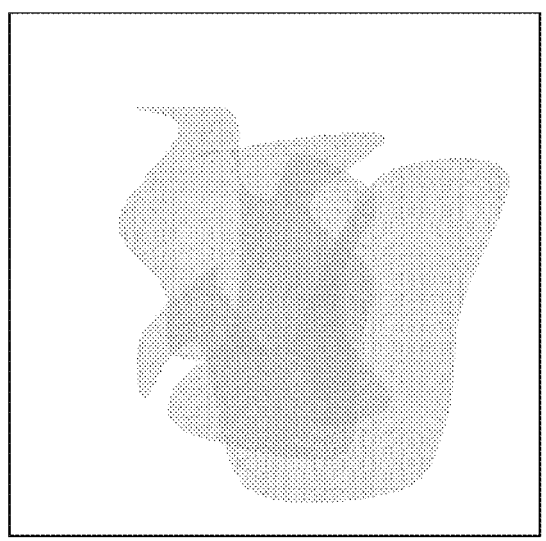
FIG. 9D shows a schematic composite image constructed from the component images of FIGS. 9A-9C.

FIGS. 9A-9C show schematic images of three different components of a sample. The three different components have different spatial distributions within the sample, and have different spectral properties. These component images can be overlaid to show the combined distributions of each of the components within the sample. To overlay the component images, each is rendered in a different color (shown schematically in FIGS. 9A-9C as different hatching patterns). The component images rendered in different colors are overlaid to form a composite image in FIG. 9D. Regions of the sample in which two or more of components co-exist are readily identified in FIG. 9D.

As discussed above, in some embodiments, the contributions of certain components can reduced to near zero, or hidden entirely. Sample autofluorescence is an example of a component contribution that a system operator may prefer to hide altogether or, alternatively, display with attenuated intensity to provide useful landmarks to the operator. Alternatively, or in addition, the system operator can choose to display contributions from sample autofluorescence in a manner that de-emphasizes these contributions relative to contributions from other components in the sample, such as by rendering autofluorescence contributions in shades of gray, where contributions from other components are rendered in color to enhance their visibility relative to autofluorescence contributions.

In some embodiments, component contributions determined from unmixing operations performed on certain types of sample images can be displayed as different types of sample images. For example, component contributions obtained from images of an absorptive sample (e.g., a sample treated with histological and/or immunohistochemical stains) can be displayed as though they were obtained from the fluorescent sample instead. This is accomplished by assigning a particular display color to each component contribution, weighting each of the contributing colors at each pixel location by the associated component contribution (e.g., component strength or intensity), and then determining the overall color at each pixel by summing the weighted colors due to each component. Regions of the constructed fluorescent image in which a high amount of absorption occurred in the sample will be rendered proportionally brighter. Further, as discussed above, the weights assigned to different colors can also be adjusted to highlight the contributions of certain components to the overall constructed fluorescent image relative to contributions from other components.

In certain embodiments, component contributions derived from unmixing operations performed on the image cube can be used to construct a red-green-blue (RGB) image of the sample instead of, or in addition to, any of the sample images and component images discussed above. To produce a RGB image, contributions from each of the components in the sample can be overlaid and displayed in colors that are selected to accurately represent the spectra of each of the components. Thus, for example, suitable spectra for each of the components can be determined from the image cube, from stored reference information for the components, from data supplied by a system operator, or from another source. Then, the contributions from each component spectrum at each pixel location can be weighted by the relative amount of each component at the pixel, as determined from the individual component images. Then, the weighted component spectra at each pixel location are summed to determine an overall color and intensity for the pixel. In this manner, the overall sample image produced can mimic a RGB image of the sample.

In some embodiments, only three wavelengths (red, green, and blue) are used to construct the RGB image. Spectral intensities of each component at each of the three wavelengths are determined (e.g., from known spectra of the components), and at each pixel in the image, the contributions at each of the three wavelengths for a particular component are weighted by the strength of the component. Weighted contributions from each of the components at each of the selected wavelengths are summed at each pixel to determine the overall red, green, and blue intensities at each pixel. These intensities can then be combined to yield the RGB image of the sample. For example, if the sample includes components such as fluorescent dyes, and the spectra of the dyes are known, contributions from each of the component dyes can be determined by unmixing operations performed on the image cube. The red, green, and blue contribution of each dye can be calculated from its known spectrum, so that the RGB value associated with each dye can be determined. RGB contributions from each dye are then weighted according to the relative amount of each dye in the sample at each pixel location, and summed to produce an RGB view of the overall sample.

Spectra associated with different sample components can be determined from the M planes of the image cube, from which a color associated with each component can be determined. The spectra can be derived from M planes of the image cube, even though fewer than M planes maybe used for the incremental unmixing operations disclosed herein. For example, in some embodiments, a sample can include a component with a non-zero contribution in a portion of the electromagnetic spectrum that is not reflected in the wavelengths corresponding to the image cube that is used in the incremental unmixing operations. An example of this situation would be a sample that includes a fluorescent dye that emits light at least partly in the red region of the spectrum; however, the image cube used for incremental spectral unmixing operations to determine an estimate of the contribution of the fluorescent dye does not include image planes that correspond to wavelengths in the red region of the spectrum. Nonetheless, because the spectrum of the fluorescent dye is known (including in the red region of the spectrum), and because the amount of the fluorescent dye at each pixel location can be accurately determined from the incremental unmixing operations, an accurate RGB rendering can be made of the color associated with the fluorescent dye.

More generally, there is a distinction between choosing wavelengths at which contributions to the RGB image are calculated, and choosing wavelengths at which spectral images are acquired to form an image cube, which is analyzed to determine component contributions to radiation from a sample. The wavelengths associated with calculated contributions to the RGB image are typically selected to render color faithfully, and this criterion often depends upon selecting colors that span a majority of the visual region of the electromagnetic spectrum. Alternatively, the choice of wavelengths at which spectral data is acquired for later unmixing is made primarily for purposes of distinguishing different components in the sample; thus, for example, the number of wavelengths can be chosen to be as small as possible while still permitting the components to be distinguished, and the specific wavelengths can be selected to produce the largest distinction among the various sample components.

When a sample is absorptive (e.g., a tissue sample prepared with one or more absorptive stains and/or scattering agents), component contributions can be determine in units of optical density. However, rendering an RGB image of such components is typically performed differently from the rendering of an sample image that corresponds to fluorescent components. This is related to the fact that contributions from fluorescent components operate in positive color space (e.g., correspond to light emitted from the components), while contributions from absorptive components operate in negative color space (e.g., correspond to light absorbed by the components). To account for this difference, one method for accurately rendering a RGB image of a sample with absorptive component contributions is to determine the absorption spectrum of each component, and then begin with a uniformly white image, and multiply the white image by the absorption spectrum of each absorptive component weighted by the amount of that component present at each pixel location. The resulting calculated RGB images corresponds to the actual RGB image that would be observed for the sample if the sample was exposed to white light and the light transmitted through the sample was detected.

For some samples, complicating factors can make rendering a RGB image purely from known component spectra and determined component contributions difficult. For example, a sample can include one or more objects or compounds that make contributions to the radiation detected from the sample, but which were not expected to be present in the sample when the sample images were obtained (and therefore do not correspond to any of the expected sample components). The presence of such objects and/or compounds can have unpredictable consequences, and may signal that the sample is contaminated, or that further study of the sample is desirable. Thus, the systems and methods disclosed herein can provide information to a system operator when the actual contents of one or more sample images do not fully correspond to an expected or constructed image of the sample based upon the components. One way to provide such information is to display a color image to the system operator that shows the actual RGB appearance of the sample in which the presence of unexpected colors might indicate a problem of this type. Alternatively, one way to provide such information includes indicating to the system operator an estimate as to whether the components of the sample, as determined from full unmixing of an image cube or from one or more incremental unmixing operations, correspond to the expected components of the sample (e.g., determined from input by the system operator).

To implement the display of a color image to the system operator that provides potential error information, the methods and systems disclosed herein can be used to determine a real-time or near real-time estimate of the color of each pixel in a sample image based on contributions from each of the sample components. As discussed above, estimates of these contributions can be determined from incremental unmixing operations and/or from full unmixing of an image cube, and can be updated as each new sample image (corresponding to a plane in the image cube) is acquired. In some embodiments, the same planes of the image cube can also be unmixed to provide estimates of the spectra associated with each of the components. That is, the same image cube can be analyzed in two ways: first, to construct an image (e.g., a RGB image) of the sample; and second, to provide estimates of the contributions of each of the components in the sample. Both of these can be calculated in real-time or near real-time.

In some embodiments, the selected color components correspond to the eye's response, as exemplified by the CIE standard observer response functions X, Y, and Z, which are mapped into RGB space for display based on the XYZ color properties of the display device. When this method of constructing the RGB image is used, the image cube can be constructed so that the cube includes planes that correspond to wavelengths in each of the color ranges associated with the response functions. In this way, the situation is similar to lighting a scene only at the specific wavelengths used for observation, and the formalism used to gauge the color rendering index for lighting can be used to compare the color rendering that will be associated with a given set of wavelengths in an image cube. At the same time, the wavelengths are typically selected to permit the various components of the sample to be distinguished according to Equation (4). While achieving accurate color rendering and achieving good spectral selectivity are different goals, increasing the total number of image planes in the image cube generally permits these different objectives to be balanced. Further, the degree of color rendering accuracy and the degree of spectral discrimination can be of greater or lesser importance in different cases, permitting flexibility in the choice of wavelengths for the image cube. For example, acceptable color rendering is typically obtained when the image cube includes at least 5 image planes, and includes at least one image plane in each of the following bands: 450-480 nm, 500-530 nm, 540-570 nm, 590-630 nm, and 640 nm or more.

Figure 10A:
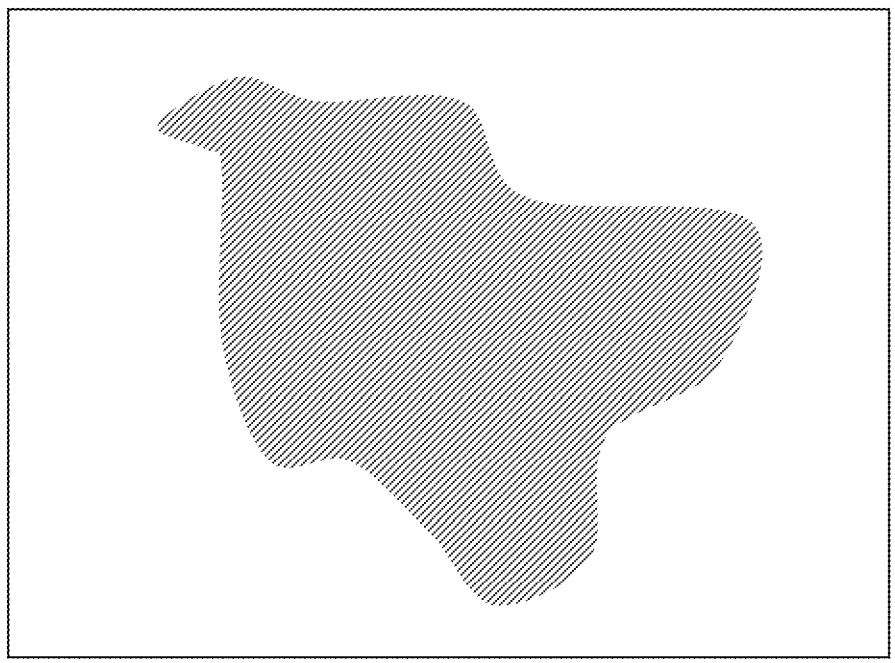
FIG. 10A shows a schematic RGB image of a sample.
Figure 10B:
FIG. 10B shows the schematic RGB image of FIG. 10A with an overlay indicating the presence of a component in the RGB image.

In certain embodiments, a threshold can be applied to component images, composite images formed by overlaying multiple component and/or other images, and other types of images. For example, in a sample image formed from one or more component images, a threshold condition can be applied to the sample image to indicate where the estimated amount of a particular component exceeds the threshold condition. In this way, regions of an image that are of relatively minor interest due to small amounts of the component can be segregated from regions of the image that include large amounts of the component, and are therefore of greater interest. FIG. 10A shows a schematic component image of a sample that indicates the spatial distribution of the component throughout the sample. In FIG. 10B, a threshold overlay condition has been applied to the image of FIG. 10A, so that only regions of the image where the amount of the component exceeds the threshold value are rendered in a dark hatching pattern; the regions where the amount of the component falls below the threshold value are rendered in a lighter hatching pattern (or no hatching pattern, where none of the component has been detected).

Error Estimates

Figure 8:
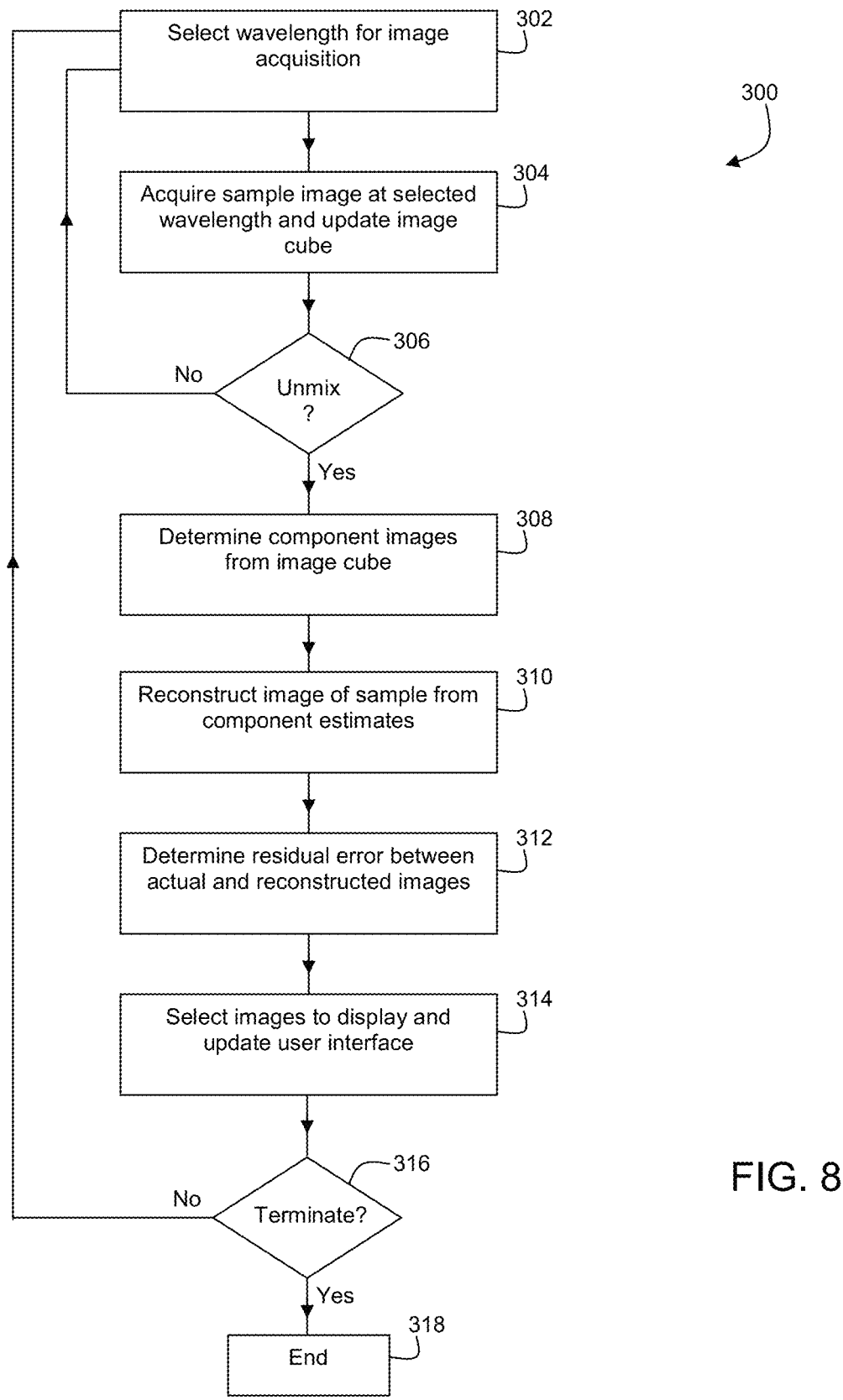
FIG. 8 is a flow chart showing steps in a procedure for estimating residual error associated with determined estimates of sample components.

In some embodiments, the methods and systems disclosed herein provide for verification of the degree to which an actual sample image corresponds directly to a weighted superposition of contributions from expected components of the sample. This information may be used to provide a numerical index, or a graphical indication (e.g., such as a color map or overlay to alert a system operator to the possibility of unexpected components), or as a quality control measure to assess the results of the unmixing operations. FIG. 8 includes a flow chart 300 that corresponds to an embodiment of a method for verifying the degree to which an actual sample image corresponds to contributions from expected sample components. In a first step 302, the wavelength corresponding to a particular plane of the sample's image cube is selected. Then, in a second step 304, a sample image corresponding to the selected wavelength is acquired and inserted into the image cube, replacing the older image plane in the cube corresponding to the same wavelength.

Next, in decision step 306, the algorithm decides (e.g., according to pre-set criteria or based on input from a system operator) whether some or all of the planes in the image cube will be unmixed. If unmixing is not performed, then control returns to step 302, and one or more additional planes are required, further updating the image cube. If unmixing is performed, then control passes to step 308, in which one or more planes of the image cube are unmixed (e.g., via incremental unmixing operations, a full unmixing of the image cube) to obtain component images. Then, in step 310, an image of the sample is reconstructed based on the contributions from the components of the sample determined in step 308. A variety of methods can be used, as discussed above, to reconstruct a sample image. In some embodiments, for example, the reconstructed spectrum at each pixel can be determined according to:

$$R(\lambda_k) = a_1 E_1(\lambda_k) + a_2 E_2(\lambda_k) \ldots a_n E_n(\lambda_k) \qquad (9)$$

where $R(\lambda_k)$ is the constructed spectrum at wavelength $\lambda_k$, $a_i$ is the estimated strength of the $i^{th}$ component, and $E_i(\lambda_k)$ is the spectrum of the $i^{th}$ component at wavelength $\lambda_k$. The notation in Equation (9) for E is a generalization of the notation in Equation (3), which considered E to include only two spectra, F and G.

The reconstructed spectrum at a particular pixel corresponds to the spectrum of the sample that would be measured if the portion of the scene corresponding to that pixel included contributions from only the expected components, if the spectra of the expected components were identical to the eigenstates in E, and if the actual component strengths matched the estimates of the component strengths derived from the unmixing operations. The actual measured spectral image S could still differ from the reconstructed spectral image R for reasons such as instrument measurement artifacts and noise, but in general the images S and R would agree.

Following calculation of the reconstructed image of the sample R in step 310, the residual error between the actual and reconstructed images of the sample is determined in step 312. The residual error RE can be calculated at one or more pixels in the image, and for a particular pixel, represents the degree to which the actual spectrum and the reconstructed spectrum differ:

$$RE(\lambda_k) = S(\lambda_k) - R(\lambda_k) \qquad (10)$$

In some embodiments, the residual error RE can be expressed as a normalized function of the reconstructed spectrum R or of the measured spectrum S, to provide an index that expresses the fraction of the overall signal that does not correspond to a mixture of the expected components. A low fractional error indicates that nearly all of the measured spectral signal corresponds to contributions from expected sample components, while a high fractional error indicates that a high proportion of the measured spectral signal does not correspond to contributions from any of the expected components. In general, the greater the fraction of the measured spectral signal that does not correspond to expected sample components, the greater the uncertainty associated with the estimates of the contributions of the expected components. In this manner, RE or metrics based upon it can be provided to the system operator, and permit verification of the overall measurement quality or integrity.

Next, in step 314 of flow chart 300, one or more images are selected for display, and the user interface is updated with the selected images. The images can include any of the various types of images disclosed herein, including component images, composite images, actual sample images, and reconstructed sample images. Further, multiple images can be overlaid. The different images can be weighted differently and/or rendered in different colors to highlight certain features and/or components, and de-emphasize other contributions. One or more error indices determined in step 312 can also be displayed.

Then, in decision step 316, the algorithm determines (e.g., based on one or more stored control settings and/or input from the system operator) whether to terminate imaging of the sample. If imaging is to continue, control returns to step 302. If imaging is to terminate, then the process finishes at step 318.

The systems and methods disclosed herein can provide one or more error indices based on the residual error RE discussed above, and/or based on a normalized residual error quantity. Further, error indices can be based on errors calculated for individual pixels or regions, or on the image as a whole, to determine whether the component estimates are reliable. For example, in some embodiments, the sample image can be separated into different regions, and one or more error indices can be determine for each region. For certain samples, measurements derived from particular regions of the sample may be unreliable based on the associated error indices, while measurements derived from other regions of the sample may be reliable. As an example, foreign material or debris may be present in localized areas within the sample; further analysis of such contaminated regions can be prevented automatically or manually based on the calculated error indices, while the remaining portions of the sample can be analyzed. Similarly, where the presence of foreign material with an unexpected spectral response could inaccurate estimates of the contributions of sample components of interest, the systems and methods disclosed herein can be determine either automatically or with manual input from a system operator than measurements obtained from regions containing the foreign material may be unreliable.

In certain embodiments, residual error-based indices can be used to mark regions of sample images with an overlay (e.g., hatched regions, or another similar indicator) to alert the system operator that component estimates derived from those regions may be unreliable. The threshold for making such an indication can be set using known limits based on prior experiments, either for indices based on RE or normalized RE, or for a combination of these. Alternatively, or in addition, the threshold can be set by the system operator. In some embodiments, when a sufficiently large proportion of a sample image is determined to be unreliable, the entire image can be marked as unreliable and further processing of the image may be terminated. In general, indications that some or all of an image is unreliable can be made by textual and/or graphical markings; such indications can be made alongside (e.g., in the margins along) the sample image, or integrated into the image using overlays, blinking indicators, differently-colored markings and/or other indicators.

As discussed above, in some embodiments, the optical properties of the sample relative to the measurement system can change relatively rapidly during imaging. Such changes can occur, for example, because the sample is changing internally, because the sample is in motion relative to the imaging system, and/or because the imaging system is undergoing reconfiguration (e.g., the focus is being adjusted). Under such circumstances, relatively high residual errors can be observed, often as a consequence of the same factors discussed above in connection with latency. However, once the sample and imaging conditions stabilize, residual errors related to latency disappear within a time interval corresponding to the acquisition of another M sample images. If high RE values persist beyond this point, the RE values can be interpreted to provide a relatively reliable indicator that estimates for the contributions of the sample components derived from the image cube are unreliable.

Hardware and Software

The steps described above in connection with various methods for collecting, processing, analyzing, interpreting, and displaying information from samples can be implemented in computer programs using standard programming techniques, including steps associated with overlapping unmixing and incremental unmixing operations. Such programs are designed to execute on programmable computers or specifically designed integrated circuits, each comprising an electronic processor, a data storage system (including memory and/or storage elements), at least one input device, and least one output device, such as a display or printer. The program code is applied to input data (e.g., images from the detector) to perform the functions described herein and generate output information (e.g., images showing contributions of sample components, overlays of multiple component images, etc.), which is applied to one or more output devices, such as a user interface that includes a display device. Each such computer program can be implemented in a high-level procedural or object-oriented programming language, or an assembly or machine language. Furthermore, the language can be a compiled or interpreted language. Each such computer program can be stored on a computer readable storage medium (e.g., CD ROM or magnetic diskette) that when read by a computer can cause the processor in the computer to perform the analysis and control functions described herein.

Other Embodiments

A number of embodiments of the invention have been described. Nevertheless, it will be understood that various modifications may be made without departing from the spirit and scope of the invention. For example, while personal computers have been described above as examples of the control system 114, other devices such as embedded controllers—including digital signal processors (DSPs)—can function as part or all of control system 114. Further, graphical processing units (GPUs) that are part of a personal computer can also function as part or all of control system 114. Instructions that perform the methods disclosed herein can be implemented in software, in firmware, and in hardware, and can be written in any suitable language or format. Similarly, while specific examples of suitable devices and hardware are disclosed herein, the methods can generally be implemented on a wide range of hardware and devices having the capabilities disclosed herein.

Other embodiments are in the claims.

What is claimed is:

1. A computer-implemented method comprising:
   acquiring a first sequence of spectral images of an animal and unmixing the first sequence of spectral images into set of component images, wherein each component image shows a spatial distribution of a different component of the animal, and wherein each component has a unique spectral signature;
   displaying at least some of the component images; and
   providing a real-time display of updated component images, wherein providing the real-time display comprises:
   (a) acquiring and combining one or more additional spectral images of the animal with at least some of the previously acquired spectral images;
   (b) unmixing the combined spectral images into a new set of component images;
   (c) displaying at least some members of the new set of component images; and
   (d) repeating steps (a)-(c).

2. The method of claim 1, wherein step (c) is repeated at a frequency of at least 1 Hz.

3. The method of claim 1, wherein acquiring spectral images of the animal comprises measuring fluorescence emission from the animal.

4. The method of claim 3, wherein acquiring spectral images of the animal comprises measuring fluorescence emission from the animal in multiple spectral wavelength bands.

5. The method of claim 3, wherein acquiring spectral images of the animal comprises illuminating the animal with excitation radiation in multiple spectral wavelength bands, and measuring the fluorescence emission from the animal in response to the illumination.

6. The method of claim 1, wherein displaying at least some members of the new set of component images comprises displaying any differences between new component images and previously unmixed component images that correspond to the same component in the animal.

7. The method of claim 1, further comprising illuminating the animal with excitation radiation to acquire the spectral images.

8. The method of claim 7, further comprising illuminating the animal with excitation radiation from different spatial regions to acquire the spectral images.

9. The method of claim 7, further comprising illuminating the animal with temporally varying excitation radiation to acquire the spectral images.

10. The method of claim 1, further comprising displaying at least some members of the new set of component images by overlaying the component images on top of one or more additional images of the animal.

11. The method of claim 1, further comprising displaying at least some members of the new set of component images in different colors relative to one another.

12. The method of claim 1, further comprising using an optical microscope to acquire the spectral images of the animal.

13. The method of claim 1, wherein each member of the first sequence of spectral images corresponds to a different spectral weighting function.

14. The method of claim 13, wherein each of the additional spectral images corresponds to one of the spectral weighting functions.

15. The method of claim 1, wherein unmixing the spectral images comprises performing a linear decomposition of the spectral images into contributions from the different components in the animal, and wherein each of the contributions corresponds to a different component image.

16. The method of claim 1, wherein the animal is a mouse.

17. The method of claim 1, wherein at least one of the different components of the animal comprises autofluorescence from tissue of the animal.

18. The method of claim 1, wherein at least one of the different components of the animal comprises a stain or marker applied to tissue of the animal.

19. The method of claim 1, wherein at least one of the different components of the animal comprises an endogenous compound in tissue of the animal.

20. The method of claim 18, wherein the stain or marker is applied to cells of the tissue.

21. The method of claim 18, wherein the stain or marker comprises at least one member selected from the group consisting of histological stains, immunohistochemical stains, fluorescent dyes, fluorescent proteins, and quantum dots.

22. An apparatus, comprising:
a radiation source configured to direct excitation radiation to an animal comprising different components, wherein each component has a unique spectral signature;
a detector configured to receive radiation from the animal;
a display unit configured to display images of the animal; and
an electronic processor configured to:
acquire a first sequence of spectral images of the animal and unmix the first sequence of spectral images into a set of component images, wherein each component image shows a spatial distribution of a different one of the components in the animal;
display at least some of the component images on the display unit; and
provide a real-time display of updated component images on the display unit by:
(a) acquiring and combining one or more additional spectral images of the animal with at least some of the previously acquired spectral images;
(b) unmixing the combined spectral images into a new set of component images;
(c) displaying at least some members of the new set of component images on the display unit; and
(d) repeating steps (a)-(c).

23. The apparatus of claim 22, wherein the electronic processor is configured to repeat step (c) at a frequency of at least 1 Hz.

24. The apparatus of claim 22, wherein the radiation source comprises light emitting diodes (LEDs), and wherein the electronic processor is configured to activate the LEDs to selectively illuminate the animal with distributions of radiation that correspond to different spectral weighting functions.

25. The apparatus of claim 24, wherein the electronic processor is configured to activate the LEDs to illuminate the animal with excitation radiation from different spatial regions to acquire the spectral images.

26. The apparatus of claim 24, wherein the electronic processor is configured to activate the LEDs to illuminate the animal with temporally varying excitation radiation to acquire the spectral images.

27. The apparatus of claim 22, further comprising a spectral filter configured to filter radiation from the animal before the radiation is received by the detector.

28. The apparatus of claim 27, wherein the spectral filter comprises a liquid crystal tunable filter.

29. The apparatus of claim 27, wherein the electronic processor is configured to adjust the spectral filter so that the detector measures radiation from the animal corresponding to different spectral weighting functions.

30. The apparatus of claim 22, wherein the detector is configured to detect fluorescence emission from the animal in response to the excitation radiation.

31. The apparatus of claim 22, wherein the electronic processor is configured to display any differences between new component images and previously unmixed component images that correspond to the same component in the animal on the display unit.

32. The apparatus of claim 22, wherein the electronic processor is configured to display at least some members of the new set of component images on the display unit by overlaying the component images on top of one or more additional images of the animal.

33. The apparatus of claim 22, wherein the electronic processor is configured to display at least some members of the new set of component images on the display unit in different colors relative to one another.

34. The apparatus of claim 24, wherein the electronic processor is configured to activate the LEDs to selectively illuminate the animal so that each member of the first sequence of spectral images corresponds to a different spectral weighting function.

35. The apparatus of claim 34, wherein the electronic processor is configured to activate the LEDs to selectively illuminate the animal so that each of the additional spectral images corresponds to one of the spectral weighting functions.

36. The apparatus of claim 29, wherein the electronic processor is configured to adjust the spectral filter so that each member of the first sequence of spectral images corresponds to a different spectral weighting function.

37. The apparatus of claim 36, wherein the electronic processor is configured to adjust the spectral filter so that each of the additional spectral images corresponds to one of the spectral weighting functions.

38. The apparatus of claim 22, wherein the electronic processor is configured to unmix the spectral images by performing a linear decomposition of the spectral images into contributions from the different components in the animal, and wherein each of the contributions corresponds to a different component image.

39. The apparatus of claim 22, wherein the animal is a mouse.

40. The apparatus of claim 22, wherein at least one of the different components of the animal comprises autofluorescence from tissue of the animal.

41. The apparatus of claim 22, wherein at least one of the different components of the animal comprises a stain or marker applied to tissue of the animal.

42. The apparatus of claim 22, wherein at least one of the different components of the animal comprises an endogenous compound in tissue of the animal.

43. The apparatus of claim 41, wherein the stain or marker is applied to cells of the tissue.

44. The apparatus of claim 41, wherein the stain or marker comprises at least one member selected from the group consisting of histological stains, immunohistochemical stains, fluorescent dyes, fluorescent proteins, and quantum dots.

* * * * *